US012580645B2

(12) United States Patent
Miryala et al.

(10) Patent No.: US 12,580,645 B2
(45) Date of Patent: Mar. 17, 2026

(54) END OF BURST INDICATION

(71) Applicant: QUALCOMM Incorporated, San Diego, CA (US)

(72) Inventors: Sriman Miryala, Hyderabad (IN); Ahmed Ragab Elsherif, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/363,569

(22) Filed: Aug. 1, 2023

(65) Prior Publication Data

US 2025/0047376 A1 Feb. 6, 2025

(51) Int. Cl.
| | |
|---|---|
| *H04W 52/02* | (2009.01) |
| *H04B 7/26* | (2006.01) |
| *H04L 5/00* | (2006.01) |
| *H04L 27/26* | (2006.01) |
| *H04W 28/06* | (2009.01) |
| *H04W 84/12* | (2009.01) |

(52) U.S. Cl.
CPC ......... *H04B 7/2656* (2013.01); *H04L 5/0048* (2013.01); *H04L 27/2692* (2013.01); *H04W 28/06* (2013.01)

(58) Field of Classification Search
None
See application file for complete search history.

(56) References Cited

U.S. PATENT DOCUMENTS

| | | | | |
|---|---|---|---|---|
| 2009/0222576 | A1* | 9/2009 | Elstermann | H04L 12/12 713/323 |
| 2013/0132603 | A1 | 5/2013 | Cohen et al. | |
| 2013/0179605 | A1 | 7/2013 | Huang et al. | |
| 2020/0412848 | A1* | 12/2020 | Wang | H04L 1/0041 |

FOREIGN PATENT DOCUMENTS

| | | |
|---|---|---|
| WO | 2023069144 A1 | 4/2023 |
| WO | 2024197217 A1 | 9/2024 |
| WO | 2024197220 A1 | 9/2024 |

OTHER PUBLICATIONS

ETSI: "MirrorLink® Audio", IEEE Draft, Technical Specification, ETSI_TS_Mirrorlink_CCC-TS-012_AUDIO-170517, IEEE-SA, Piscataway, NJ USA, vol. 802.11 ETSI ITS, Jun. 6, 2017, ETSI TS 1DD DDD V1.3.0, pp. 1-38, May 2017, XP068162609, p. 16, 5.4.
International Search Report and Written Opinion—PCT/US2024/037385—ISA/EPO—Oct. 17, 2024.

* cited by examiner

*Primary Examiner* — Maharishi V Khirodhar
(74) *Attorney, Agent, or Firm* — Harrity & Harrity, LLP

(57) ABSTRACT

Various aspects of the present disclosure generally relate to wireless communication. In some aspects, a central device may transmit a start indication that indicates a start of a burst. The central device may transmit the burst. The central device may transmit an end indication that indicates an end of the burst. Numerous other aspects are described.

21 Claims, 17 Drawing Sheets

Flash
210

Memory
206

ROM
208

MMU
240

Processor(s)
202

Connector
Interface
220

Display
Circuitry
204

Display
242

Antenna
235c

Antenna
235d

WLAN
Controller
250

254

WPAN
Controller
252

Antenna
235a

Antenna
235b

WWAN
Controller
256

258

260

Radio
230

300

500

1200

1410  Transmit a start indication that indicates a start of a burst

1420  Transmit the burst

1430  Transmit an end indication that indicates an end of the burst

1400

1510 Receive a first start indication that indicates a start of a first burst

1520 Receive the first burst

1530 Receive a first end indication that indicates an end of the first burst

1500

END OF BURST INDICATION

FIELD OF THE DISCLOSURE

Aspects of the present disclosure generally relate to wireless communication and to techniques and apparatuses associated with an end of burst indication for audio traffic.

BACKGROUND

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), Bluetooth Low Energy (BLE) (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data capacity throughput, and are susceptible to interference from other devices communicating in the same frequency band (such as via wireless local area network (WLAN) communications).

SUMMARY

Some aspects described herein relate to a method of wireless communication performed by a central device. The method may include transmitting a start indication that indicates a start of a burst. The method may include transmitting the burst. The method may include transmitting an end indication that indicates an end of the burst.

Some aspects described herein relate to a method of wireless communication performed by a peripheral device. The method may include receiving a first start indication that indicates a start of a first burst. The method may include receiving the first burst. The method may include receiving a first end indication that indicates an end of the first burst.

Some aspects described herein relate to a central device for wireless communication. The central device may include one or more memories and one or more processors coupled to the one or more memories. The one or more processors may be individually or collectively configured to cause the central device to transmit a start indication that indicates a start of a burst. The one or more processors may be individually or collectively configured to cause the central device to transmit the burst. The one or more processors may be individually or collectively configured to cause the central device to transmit an end indication that indicates an end of the burst.

Some aspects described herein relate to a peripheral device for wireless communication. The peripheral device may include one or more memories and one or more processors coupled to the one or more memories. The one or more processors may be individually or collectively configured to cause the peripheral device to receive a first start indication that indicates a start of a first burst. The one or more processors may be configured to receive the first burst. The one or more processors may be individually or collectively configured to cause the peripheral device to receive a first end indication that indicates an end of the first burst.

Some aspects described herein relate to a non-transitory computer-readable medium that stores a set of instructions for wireless communication by a central device. The set of instructions, when executed by one or more processors of the central device, may cause the central device to transmit a start indication that indicates a start of a burst. The set of instructions, when executed by one or more processors of the central device, may cause the central device to transmit the burst. The set of instructions, when executed by one or more processors of the central device, may cause the central device to transmit an end indication that indicates an end of the burst.

Some aspects described herein relate to a non-transitory computer-readable medium that stores a set of instructions for wireless communication by a peripheral device. The set of instructions, when executed by one or more processors of the peripheral device, may cause the peripheral device to receive a first start indication that indicates a start of a first burst. The set of instructions, when executed by one or more processors of the peripheral device, may cause the peripheral device to receive the first burst. The set of instructions, when executed by one or more processors of the peripheral device, may cause the peripheral device to receive a first end indication that indicates an end of the first burst.

Some aspects described herein relate to an apparatus for wireless communication. The apparatus may include means for transmitting a start indication that indicates a start of a burst. The apparatus may include means for transmitting the burst. The apparatus may include means for transmitting an end indication that indicates an end of the burst.

Some aspects described herein relate to an apparatus for wireless communication. The apparatus may include means for receiving a first start indication that indicates a start of a first burst. The apparatus may include means for receiving the first burst. The apparatus may include means for receiving a first end indication that indicates an end of the first burst.

Aspects generally include a method, apparatus, system, computer program product, non-transitory computer-readable medium, user equipment, base station, network entity, network node, central device, peripheral device, wireless communication device, access point, mobile station, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
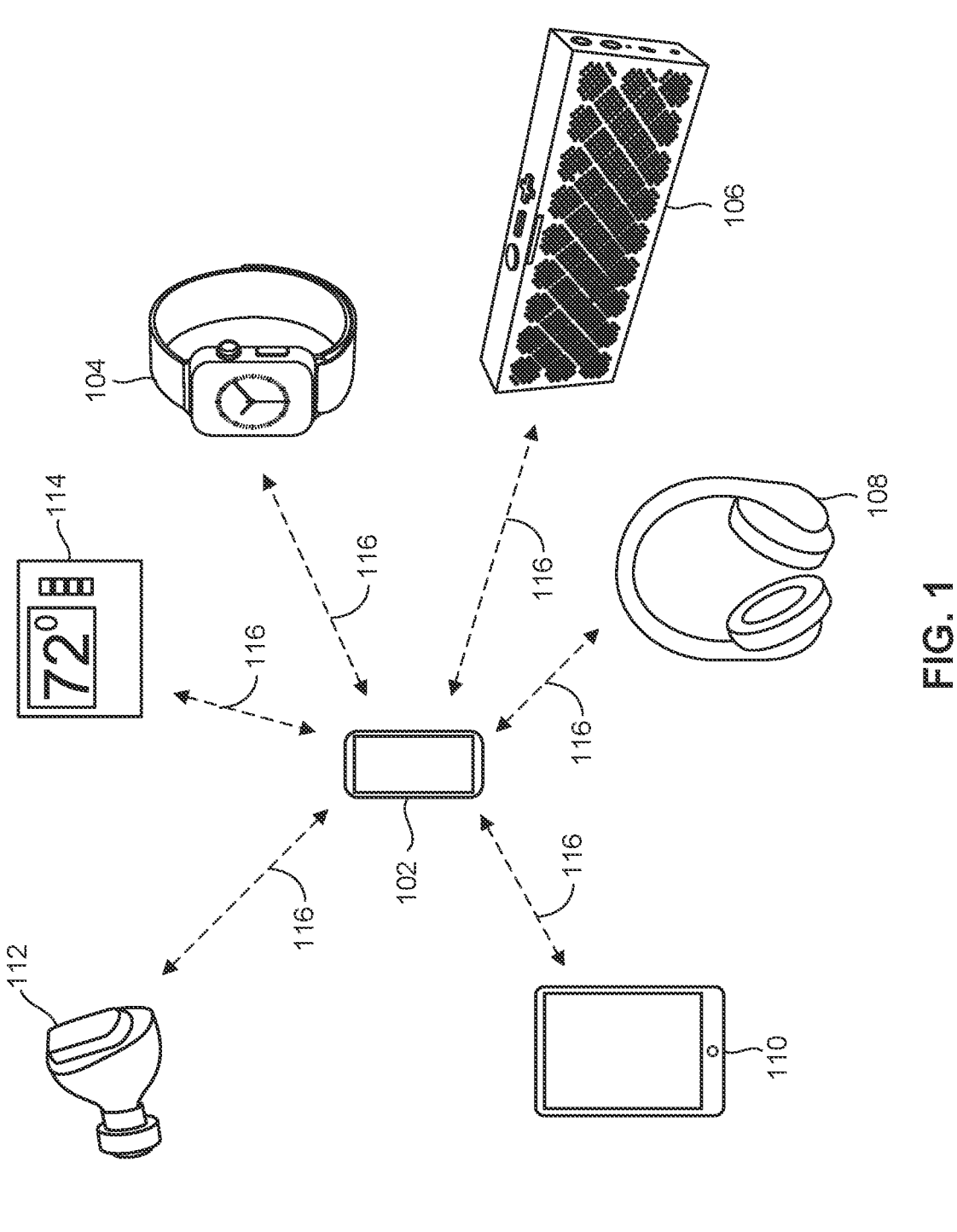
FIG. 1 is a diagram illustrating an example of a wireless personal area network (WPAN), in accordance with the present disclosure.

In a wireless personal area network (WPAN), such as a Bluetooth (BT) network or a Bluetooth Low Energy (BLE) network, wireless audio may stream from a central device (e.g., a handset, a smartphone) to multiple peripheral devices (e.g., a left earbud and a right earbud). These devices may operate as part of an extended personal area network (XPAN) that provides whole house coverage (WHC), where the devices may connect to each other and work throughout a home or office. In an XPAN, Wi-Fi features of an access point (AP) can be used to extend the connection between the handset and the earbuds beyond the range of Bluetooth for better WHC. For example, the handset may transmit audio data to the AP, which will then transmit the audio data to the earbuds. This means that a user can leave the handset on a desk in one room and hear the audio in the earbuds (or continue a phone call) in another room that is outside of the normal Bluetooth range (but within the range of the AP). In this way, a user does not need to carry the handset throughout the home or office to use wireless earbuds.

When earbuds wake up to retrieve traffic from the central device, the earbuds do not know the end of the traffic burst from the central device. Therefore, the earbuds may implement an inactivity time out (ITO) mechanism. ITO is a period of time that the earbuds will be active after receiving an audio packet, in anticipation of another audio packet from the central device. The earbud is expected be in an active state during the ITO duration. ITO increases power consumption of the earbuds and hence reduces the battery life of the earbuds, because the earbuds do not know when the end of the burst is to occur. While the earbuds may implement the ITO mechanism in an attempt to conserve power, if no audio packets are received during that time, the earbuds waste battery power. If the earbuds consume more power than necessary, the earbuds may stop operating sooner than expected, which can lead to a poorer user experience.

According to various aspects described herein, the central device may indicate a start of burst (SOB) and an end of burst (EOB) in audio packets to the earbuds. As an EOB indicates that there are no more packets for the burst, the earbuds may power down after the EOB rather than staying active for an ITO duration. By not staying active when there are no audio packets, the earbuds may conserve more power and extend the time that a user can enjoy WHC.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a central device 102 (which may be referred to herein as a source device or using other suitable terminology) may connect to and may establish a communication link 116 with one or more peripheral devices, such as a smartwatch 104, a Bluetooth portable speaker 106, wireless headphones 108, a tablet 110, a wireless earbud 112, a smart appliance 114 (which may be referred to herein as sink devices or using other suitable terminology) using a BLE protocol or a modified BLE protocol. The BLE protocol is part of the BT core specification and enables radio frequency communication operating within the globally accepted 2.4 GHz Industrial, Scientific, and Medical (ISM) band.

In some aspects, as described herein, the central device 102 may include suitable logic, circuitry, interfaces, processors, and/or code that may be used to communicate with the one or more peripheral devices 104, 106, 108, 110, 112, and/or 114 using the BLE protocol or the modified BLE protocol. In some aspects, the central device 102 may operate as an initiator to request establishment of a link layer (LL) connection with an intended peripheral device 104, 106, 108, 110, 112, and/or 114. In some aspects, a link manager may be used to control operations between a WPAN application controller in the central device 102 and a WPAN application controller in each of the intended peripheral devices 104, 106, 108, 110, 112, and/or 114.

In some aspects, after a requested LL connection is established, the central device 102 may become a host device, and the selected or intended peripheral device 104, 106, 108, 110, 112, and/or 114 may become paired with the central device 102 over the established LL connection. As a host device, the central device 102 may support multiple concurrent LL connections with various peripheral devices 104, 106, 108, 110, 112, and/or 114 that are operating as client devices. For example, the central device 102 may manage various aspects of data packet communication in an LL connection with one or more associated peripheral devices 104, 106, 108, 110, 112, and/or 114. For example, the central device 102 may determine an operation schedule in the LL connection with one or more peripheral devices 104, 106, 108, 110, 112, and/or 114. The central device 102 may also initiate an LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, and/or 114 may take place within connection events.

In some aspects, the central device 102 may be configured to transmit the first LL data PDU in each connection event to an intended peripheral device 104, 106, 108, 110, 112, and/or 114. Additionally, or alternatively, in some aspects, the central device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the central device 102. In some other aspects, a peripheral device 104, 106, 108, 110, 112, and/or 114 may transmit an LL data PDU to the central device 102 without first receiving an LL data PDU from the central device 102.

Examples of the central device 102 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an electric meter, a gas pump, a toaster, a thermostat, a hearing aid, a blood glucose on-body unit, an Internet-of-Things (IoT) device, or the like.

Examples of the one or more peripheral devices 104, 106, 108, 110, 112, and/or 114 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the central device 102 is illustrated in FIG. 1 as being in communication with six peripheral devices 104, 106, 108, 110, 112, and 114 in the WPAN 100, it will be appreciated that the central device 102 may communicate with more or fewer than six peripheral devices within the WPAN 100 without departing from the scope of the present disclosure.

In some aspects, a device implementing the BT protocol (e.g., the central device 102) may operate according to a first radio mode (e.g., a basic rate (BR)/enhanced data rate (EDR) radio mode), and a device implementing the BLE protocol may operate according to a second radio mode (e.g., the BLE radio mode). In some aspects, the central device 102 may be configured with dual radio modes, and therefore may be able to operate according to the BR/EDR mode or the BLE mode, for example, based on the type of short-range wireless communication in which the central device 102 may engage.

For example, in some aspects, the central device 102 may operate according to the BR/EDR mode for continuous streaming of data, for broadcast networks, for mesh networks, and/or for some other applications in which a relatively higher data rate may be more suitable. Additionally, or alternatively, the central device 102 may operate according to the BLE mode for short burst data transmissions, such as for some other applications in which power conservation may be desirable and/or a relatively lower data rate may be acceptable. Additionally, or alternatively, in some aspects, the central device 102 may operate according to one or more other radio modes, such as proprietary radio mode(s). Examples of other radio modes may include high speed radio modes, low energy radio modes, and/or isochronous radio modes, among other examples.

In some aspects, as described in more detail elsewhere herein, an assisting wireless device (e.g., among peripheral devices 104, 106, 108, 110, 112, and 114) may track a first retransmission metric that is based on a number of retransmitted packets that the assisting wireless device received from a source device, such as the central device 102. The assisting wireless device may receive, from a sink wireless device (e.g., among peripheral devices 104, 106, 108, 110, 112, and 114), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 104, 106, 108, 110, 112, and 114) may track a first retransmission metric that is based on a number of retransmitted packets that the sink wireless device received from a source device, such as the central device 102. The sink wireless device may transmit, to an assisting wireless device (e.g., among peripheral devices 104, 106, 108, 110, 112, and 114), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

As indicated above, FIG. 1 is provided as an example. Other examples may differ from what is described with regard to FIG. 1.

Figure 2:
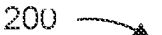
FIG. 2 is a diagram illustrating an example of a wireless communication device, in accordance with the present disclosure.

FIG. 2 is a diagram illustrating an example of a wireless communication device 200, in accordance with the present disclosure. In some aspects, the wireless communication device 200 may be an example of the central device 102 illustrated in FIG. 1. Additionally, or alternatively, the wireless communication device 200 may be an example of one or more of the peripheral devices 104, 106, 108, 110, 112, or 114 illustrated in FIG. 1. In some aspects, the wireless communication device 200 may be a Bluetooth-enabled device (such as a BLE device).

As shown in FIG. 2, the wireless communication device 200 may include a processing element, such as processor(s) 202, which may execute program instructions for the wireless communication device 200. The wireless communication device 200 may also include a display 242 that can perform graphics processing and present information to a user. The processor(s) 202 may also be coupled to a memory management unit (MMU) 240, which may be configured to receive addresses from the processor(s) 202 and translate the addresses to address locations in memory such as memory 206, ROM 208, or flash memory 210 and/or to address locations in other circuits or devices, such as display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless communication device 200. For example, the wireless communication device 200 may include various memory types, a connector interface 220 through which the wireless communication device 200 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) subsystem). The wireless communication device 200 may include multiple antennas 235a, 235b, 235c, and/or 235d for performing wireless communication with, for example, wireless communication devices in a WPAN. In some aspects, the WPAN may be an extended PAN (XPAN).

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 230 may include separate controllers configured to control communications for various respective radio access technology (RAT) protocols. For example, as shown in FIG. 2, radio 230 may include a WLAN controller 250 that manages WLAN communications, a WPAN controller 252 that manages Bluetooth, BLE, and/or other suitable WPAN communications, and a wireless wide area network (WWAN) controller 256 that manages WWAN communications. In some aspects, the wireless communication device 200 may store and execute a WLAN software driver for controlling WLAN operations performed by the WLAN controller 250, a WPAN software driver for controlling WPAN operations performed by the WPAN controller 252, and/or a WWAN software driver for controlling WWAN operations performed by the WWAN controller 256.

In some aspects, a first coexistence interface 254 (such as a wired interface) may be used for sending information between the WLAN controller 250 and the WPAN controller 252. Additionally, or alternatively, in some aspects, a second coexistence interface 258 may be used for sending information between the WLAN controller 250 and the WWAN controller 256. Additionally, or alternatively, in some aspects, a third coexistence interface 260 may be used for sending information between the WPAN controller 252 and the WWAN controller 256.

In some aspects, one or more of the WLAN controller 250, the WPAN controller 252, and/or the WWAN controller 256 may be implemented as hardware, software, firmware, or any suitable combination thereof.

In some aspects, the WLAN controller 250 may be configured to communicate with a second device in a WPAN using a WLAN link using one or more, some, or all of the antennas 235a, 235b, 235c, and 235d. In other configurations, the WPAN controller 252 may be configured to communicate with at least one second device in a WPAN using one or more, some, or all of the antennas 235a, 235b, 235c, and 235d. In other configurations, the WWAN controller 256 may be configured to communicate with a second device in a WPAN using one or more, some, or all of the antennas 235a, 235b, 235c, and 235d. The WLAN controller 250, the WPAN controller 252, and/or the WWAN controller 256 may be configured to adjust a wakeup time interval and a shutdown time for the wireless communication device 200.

A short-range wireless communications protocol, such as BT, BLE, and/or BR/EDR, may include and/or may use one or more other communications protocols, for example, to establish and maintain communications links. Referring also to FIG. 1, the wireless communication device 200 may establish a communications link 116 with one or more peripheral devices, such as a wireless headset 112, according to at least one communications protocol for short-range wireless communications. In some aspects, the communications link 116 may include a communications link that adheres to a protocol included and/or for use with BT, BLE, BR/EDR, or the like. In one aspect, the communications link 116 may include an asynchronous connection-oriented logical (ACL) transport, sometimes referred to as an ACL link. When operating as an ACL link, the communications link 116 may allow the central device 102 (e.g., a source device) to connect or "pair" with a peripheral device, such as the headset 112. The connection is asynchronous in that the two devices may not need to synchronize, timewise, data communications between each other to permit communication of data packets via the communications link 116.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 116 may include an advanced audio distribution profile (A2DP) link. For example, an A2DP link may provide a point-to-point link between a source device, such as the central device 102, and a sink device, such as the headset 112. With an A2DP link, data packets including audio may be transmitted over an ACL channel, and other information (e.g., for controlling the audio stream) may be transmitted over a separate control channel. The data packets may occur non-periodically.

In some aspects, the communications link 116 may support synchronous logical transport mechanisms between a source device (such as the central device 102) and a peripheral device (such as the headset 112). For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 116 shown in FIG. 1 may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, a central device (e.g., a central device 102, a handset, a user equipment (UE), an AP, a STA) includes means for transmitting a start indication that indicates a start of a burst; means for transmitting the burst; and/or means for transmitting an end indication that indicates an end of the burst. The means for the central device to perform operations described herein may include, for example, one or more of antennas 235a-235d, WPAN controller 252, radio 230, and/or processor 202, among other examples.

In some aspects, a peripheral device (e.g., earbud, wearable device, portable speaker) includes means for receiving a first start indication that indicates a start of a first burst; means for receiving the first burst; and/or means for receiving a first end indication that indicates an end of the first burst. The means for the central device to perform operations described herein may include, for example, one or more of antennas 235a-235d, WPAN controller 252, radio 230, and/or processor 202, among other examples.

As indicated above, FIG. 2 is provided as an example. Other examples may differ from what is described with regard to FIG. 2.

Figure 3:
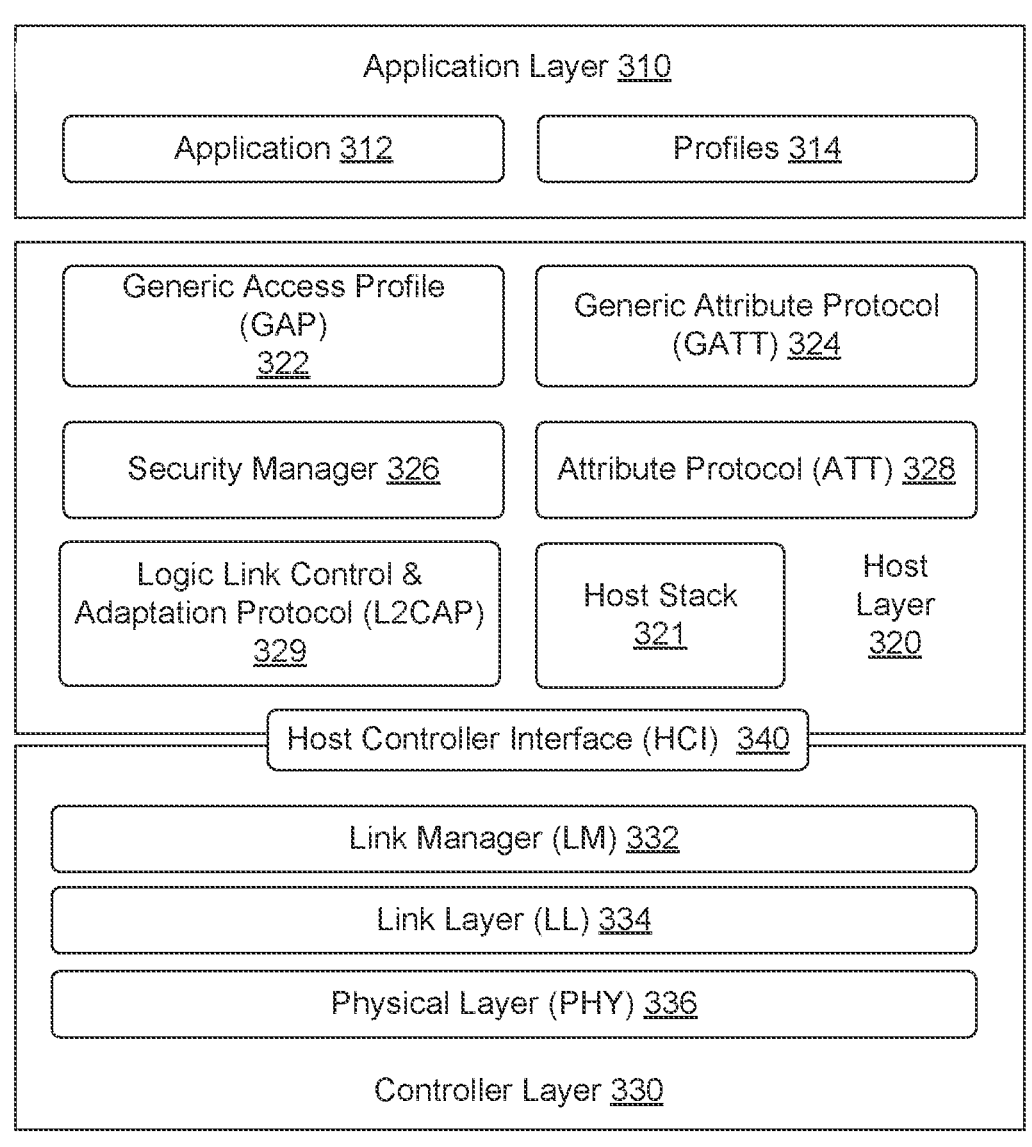
FIG. 3 is a diagram illustrating an example of a protocol stack, in accordance with the present disclosure.

FIG. 3 is a diagram illustrating an example 300 of a protocol stack (e.g., a WPAN and/or a Bluetooth protocol stack), in accordance with the present disclosure. In some aspects, the protocol stack 300 may be implemented in a wireless communication device (such as the central device 102 or one or more of the peripheral devices 104, 106, 108, 110, 112, or 114 of FIG. 1). For example, the protocol stack 300 may be implemented by one or more of processor(s) 202, memory 206, flash memory 210, ROM 208, the radio 230, and/or the WPAN controller 252 illustrated in FIG. 2. In some aspects, the protocol stack 300 may be organized into three layers that include an application layer 310, a host layer 320, and a controller layer 330.

In some aspects, the application layer 310 may be a user application layer that interfaces with the other blocks and/or layers of the protocol stack 300. In some aspects, the application layer 310 may include one or more applications 312 and one or more Bluetooth profiles 314 that allow the one or more applications 312 to use Bluetooth and/or BLE communications. The host layer 320 may include the upper layers of the protocol stack 300, and may communicate with a controller (such as the WPAN controller 252 of FIG. 2) in a wireless communication device using a host controller interface (HCI) 340. In some aspects, the host layer 320 may include a host stack 321 that can be used for application layer interface management to allow an application 312 to access WPAN communications.

The controller layer 330 may include the lower layers of the protocol stack 300. In some aspects, the controller layer 330 may be used for hardware interface management, link establishment, and link management. As shown in FIG. 3, the controller layer 330 may include a link manager (LM) 332, a link layer 334, and a physical (PHY) layer 336. The PHY layer 336 may include, for example, a radio and/or a baseband processor. In some aspects, the PHY layer 336 may define a mechanism for transmitting a bit stream over a physical link or channel that connects WPAN devices. The bit stream may be grouped into code words or symbols, and may be converted to a data packet that is transmitted over a wireless transmission medium. The PHY layer 336 may provide an electrical, mechanical, and/or procedural interface to the wireless transmission medium. The PHY layer 336 may be responsible for modulation and demodulation of data into radio frequency (RF) signals for transmission over the air. The PHY layer 336 may describe the physical characteristics of a transmitter/receiver (or transceiver) included in a wireless communication device. The physical characteristics may include modulation characteristics, an RF tolerance, and/or a sensitivity level, among other examples.

In some aspects, the link layer 334 is responsible for low-level communication over the PHY layer 336. The link layer 334 may manage the sequence and timing for transmitting and receiving data packets, and using an LL protocol, communicates with other devices regarding connection parameters and data flow control. The link layer 334 also provides gatekeeping functionality to limit exposure and data exchange with other devices. If filtering is configured, the link layer 334 maintains a list of allowed devices and may ignore all requests for data exchange from devices not on the list of allowed devices. The link layer 334 may also reduce power consumption. In some aspects, the link layer 334 may include a proprietary LL that may be used to discover peer devices, and establish a secure communication channel with the peer devices. In some aspects, the link layer 334 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 332 may be responsible for establishing and configuring links and managing power-change requests, among other tasks. Each type of logical link, such as ACL links, A2DP links, SCO links, eSCO links, ISO links, or the like, may be associated with a specific packet type. For example, an SCO link may provide reserved channel bandwidth for communication between a central device and a peripheral device, and may support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 332 may communicate with the host layer 320 using the HCI 340. In some aspects, the link manager 332 may translate commands associated with the HCI 340 into controller-level operations, such as baseband-level operations. The HCI 340 may act as a boundary between the lower layers (such as between the controller layer 330, the host layer 320, and the application layer 310). The BT specification may define a standard HCI to support BT systems that are implemented across two separate processors. For example, a BT system on a computer may use a processor of the BT system to implement the lower layers of the protocol stack 300, such as the PHY layer 336, the link layer 334, and/or the link manager 332, and may use a processor of a BT component to implement the other layers of the protocol stack 300, such as the host layer 320 and the application layer 310.

In FIG. 3, the host layer 320 is shown to include a generic access profile (GAP) 322, a generic attribute protocol (GATT) 324, a security manager (SM) 326, an attribute protocol (ATT) 328, and an L2CAP layer 329. The GAP 322 may provide an interface for an application 312 to initiate, establish, and manage connections with other WPAN (e.g., BT or BLE) devices. The GATT 324 may provide a service framework using the attribute protocol for discovering services, and for reading and writing characteristic values on a peer device. The GATT 324 may interface with the application 312, for example, through a profile which may define a collection of attributes and any permissions needed for the attributes to be used in BT or BLE communications.

The security manager 326 may be responsible for device pairing and key distribution. A security manager protocol implemented by the security manager 326 may define how communications with the security manager of a counterpart BLE device are performed. The security manager 326 provides additional cryptographic functions that may be used by other components of the protocol stack 300. The architecture of the security manager 326 used in WPAN communications is designed to minimize recourse requirements for peripheral devices by shifting work to a presumably more powerful central device. BLE uses a pairing mechanism for key distribution. The security manager 326 provides a mechanism to encrypt the data and a mechanism to provide data authentication.

The ATT 328 includes a client/server protocol based on attributes associated with a BLE device configured for a particular purpose. Examples may include monitoring heart rate, temperature, broadcasting advertisements, or the like. The attributes may be discovered, read, and written by peer devices. The set of operations which are executed over the ATT 328 may include error handling, server configuration, find information, read operations, write operations, and/or queued writes. The ATT 328 may form the basis of data exchange between BT and BLE devices.

The L2CAP layer 329 may be implemented above the HCI 340, and may communicate with the controller layer 330 through the HCI 340. The L2CAP layer 329 may be responsible for establishing connections across one or more existing logical links and for requesting additional links if none exist. The L2CAP layer 329 may also implement multiplexing between different higher-layer protocols, for example, to allow different applications to use a single link, such as a logical link, including an ACL link. In some implementations, the L2CAP layer 329 may encapsulate multiple protocols from the upper layers into a data packet format (and vice versa). The L2CAP layer 329 may also break packets with a large data payload from the upper layers into multiple packets with the data payload segmented into smaller size data payloads that fit into a maximum payload size (for example, twenty-seven (27) bytes) on the transmit side.

In some standards and protocols, such as BLE and/or BR/EDR, the central device 102 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet, and failure of MIC validation may indicate that another packet has not been received (although failure of CRC validation may also indicate that another packet has not been received, and/or failure of MIC validation may also indicate one or more errors in a received packet).

CRC validation and MIC validation may be based on generating CRC values and MICs, respectively, based on received packets and respectively comparing those generated CRC values and MICs to CRC values and MICs included in the received packets. Specifically, a receiving device, such as the headset 112, that receives a packet may first generate a CRC value or a CRC checksum based on the received packet, such as based on a payload and, if applicable, an MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines that the received packet fails CRC validation, then the received packet may include errors and/or may be corrupted. In one configuration, the receiving device may discard the received packet that fails CRC validation. Alternatively, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate an MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation. Alternatively, in another configuration, the receiving device may attempt to recover the received packet.

As indicated above, FIG. 3 is provided as an example. Other examples may differ from what is described with regard to FIG. 3.

Figure 4:
FIG. 4 is a diagram illustrating an example transmission of a data packet from a wireless communication device to a peripheral device over a WPAN connection, in accordance with the present disclosure.

FIG. 4 is a diagram illustrating an example transmission 400 of a data packet from a source device 410 to a sink device 420 over a WPAN connection 430, according to the present disclosure. In some aspects, the source device 410 may be one example of the central device 102 in FIG. 1 and/or the wireless communication device 200 in FIG. 2, and the sink device 420 may be an example of one or more of the peripheral devices 104, 106, 108, 110, 112 or 114 in FIG. 1. In some aspects, the sink device 420 may be a wireless earbud, a pair of wireless earbuds, a wireless portable speaker, or another suitable device. The WPAN connection 430 may be any suitable Bluetooth or BLE connection or link. In some instances, the WPAN connection 430 may be one or more of an ACL link, an L2CAP link, an A2DP link, an SCO link, or an ISO link.

As shown in FIG. 4, the source device 410 may include an encoder 412 and a transmit buffer 414. The encoder 412 may be configured to encode data, such as audio or video data, using a specified bitrate. The transmit buffer 414 may be configured to queue data packets that are to be transmitted over the WPAN connection 430 to the sink device 420. In some implementations, the data packets to be transmitted over the WPAN connection 430 may have a predefined size, for example, based on the type of WPAN connection 430 and/or channel conditions associated with the WPAN connection 430. In some aspects, data encoded by the encoder 412 may be packetized into a data packet of a predefined size. The source device 410 may de-queue data packets from the transmit buffer 414 and transmit the data packets to the sink device 420 over the WPAN connection 430.

As further shown in FIG. 4, the sink device 420 may include a receive buffer 422 and a decoder 424. Data packets that the sink device 420 receives over the WPAN connection 430 may be queued or otherwise stored in the receive buffer 422. The data packets may be output from the receive buffer 422 and forwarded to the decoder 424. In some aspects, the decoder 424 may decode data (such as audio and/or video data) carried in the payloads of the queued data packets, and forward the decoded data to upper layers of the protocol stack for processing and playback to a user. In some implementations, the encoder 412 may encode a first encoder/decoder (codec) frame using a first bitrate and forward the first codec frame to the transmit buffer 414 to be packetized for transmission to the sink device 420 over the WPAN connection 430. The sink device 420 may queue the received data packet in the receive buffer 422 and may forward the first portion of the first codec frame to the decoder 424 for decoding.

As indicated above, FIG. 4 is provided as an example. Other examples may differ from what is described with regard to FIG. 4.

Figure 5:
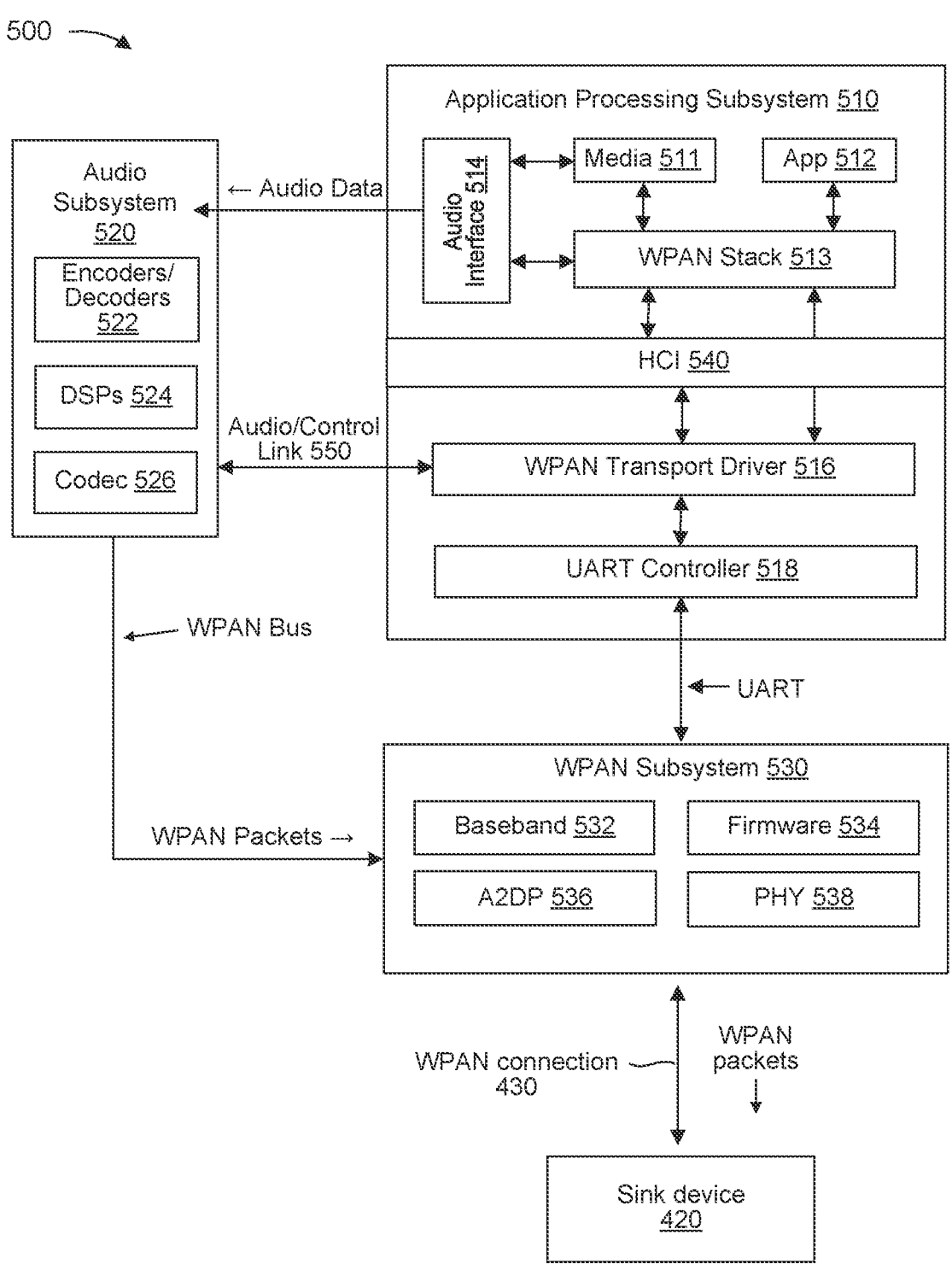
FIG. 5 is a diagram illustrating an example of a wireless communication device, in accordance with the present disclosure.

FIG. 5 is a diagram illustrating an example 500 of a wireless communication device 500, according to the present disclosure. In some aspects, the wireless communication device 500 may be an example of the central device 102 in FIG. 1, the wireless communication device 200 in FIG. 2, or the source device 410 in FIG. 4. In example 500, the wireless communication device 500 is depicted as having an established WPAN connection 430 (e.g., a Bluetooth communication connection) with the sink device 420 in FIG. 4.

The wireless communication device 500 may include an application processing subsystem 510, an audio subsystem 520, a WPAN subsystem 530, and an HCI 540. The application processing subsystem 510, which may correspond to at least some portions of the application layer 310 and the host layer 320 of the protocol stack 300 of FIG. 3, is shown to include a media player 511, an application layer 512, a WPAN stack 513, and an audio interface 514. The media player 511 can be any suitable device or component capable of generating or receiving multimedia content including, for example, real-time audio streams, real-time video streams, real-time gaming streams, and/or latency-sensitive traffic, among other examples. The application layer 512, which may be one implementation of the application layer 310 of FIG. 3, includes at least one Bluetooth profile that defines the collection of attributes and associated permissions to be used in Bluetooth or BLE communications. In some aspects, the application layer 512 may include processing resources including, for example, the memory 206, the ROM 208, and/or the flash memory 210 of FIG. 2. The WPAN stack 513 may be one implementation of the protocol stack 300 of FIG. 3.

In some aspects, as shown in FIG. 5, the application processing subsystem 510 may include a WPAN transport driver 516, which may include a split audio and packetization module (not shown for simplicity) that can packetize data (such as audio and/or video data) into Bluetooth frames that can be transmitted to the sink device 420 using a Bluetooth and/or BLE protocol. In some aspects, the WPAN transport driver 516 may be connected to the audio subsystem 520 via an audio and control link 550. In some aspects, the audio and control link 550 may be used to send encoded audio/video data and control signals between the WPAN transport driver 516 and audio/video DSPs within the audio subsystem 520. The WPAN transport driver 516 is also connected to a universal asynchronous receiver-transmitter (UART) controller 518 that provides controls for transmission of information via the WPAN connection 430.

The audio subsystem 520 may include encoders/decoders 522, one or more DSPs 524, and one or more codecs 526. The encoders/decoders 522 may be used to sample audio/video data extracted from one or more packets received from another wireless communication device. The extracted audio/video data may be processed in the application processing subsystem 510 based at least in part on the Bluetooth profile. In some implementations, the encoders/decoders 522 may partition the sampled audio/video data into payloads that can be embedded within one or more Bluetooth packets for transmission to the sink device 420 over the WPAN connection 430. In some instances, the DSPs 524 and/or the codecs 526 may employ one or more encoding or decoding algorithms in conjunction with sampling the audio data.

The WPAN subsystem 530 may include a baseband component 532 (e.g., a Bluetooth baseband component), a firmware component 534, an A2DP component 536, and a PHY component 538. The baseband component 532 and the firmware component 534 may be used to generate baseband signals for constructing and deconstructing data frames based on the Bluetooth or BLE protocol. The baseband component 532 and the firmware component 534 may also be used to generate carrier signals for up-converting baseband signals during data transmissions and for down-converting received data signals to baseband. The A2DP component 536 may be used to control or manage an A2DP link between the wireless communication device 500 and the sink device 420. Specifically, when the WPAN subsystem 530 is in a receive mode, the PHY component 538 can be used to receive, demodulate, and down-convert data packets received over the WPAN connection 430, and to forward the data packets to the application processing subsystem 510. When the WPAN subsystem 530 is in a transmit mode, the PHY component 538 can be used to encapsulate data provided from the upper layers into one or more Bluetooth frames or packets for transmission to the sink device 420 over the WPAN connection 430.

As indicated above, FIG. 5 is provided as an example. Other examples may differ from what is described with regard to FIG. 5.

Figure 6:
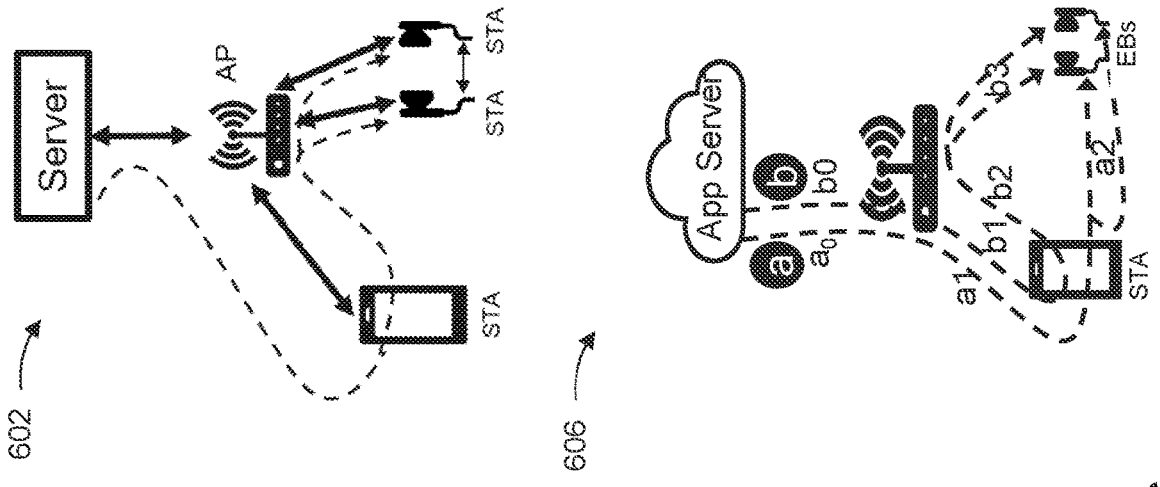
FIG. 6 is a diagram illustrating examples of extended PAN (XPAN) topologies, in accordance with the present disclosure.
Figure 6:
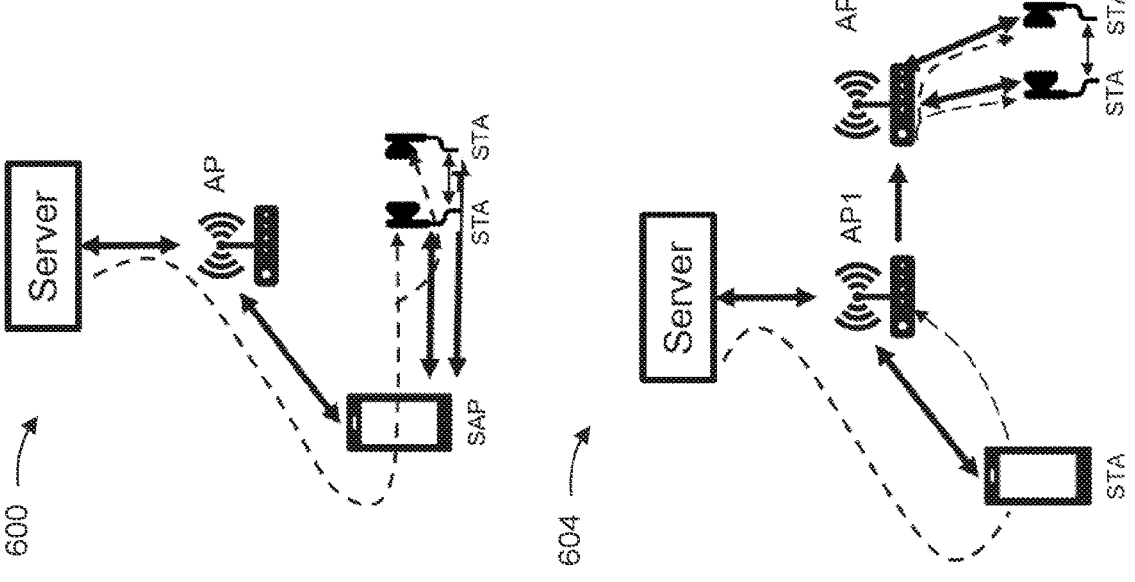

FIG. 6 is a diagram illustrating examples 600, 602, 604, and 606 of XPAN topologies, in accordance with the present disclosure.

A wireless communication device, such as a handset (HS) device or STA (e.g., phone), may operate as part of an XPAN that provides WHC. In an XPAN, the Bluetooth upper layers of the protocol stack can be reused and a transport flow from the Bluetooth controller to the Wi-Fi controller for transmitting audio packets can be changed such that the handset can connect to peripheral devices (e.g., earbuds) via an AP. By connecting to an AP, Wi-Fi features can be used to extend the connection between the handset and the earbuds beyond the range of Bluetooth for better WHC. For example, the handset may transmit audio data to an AP, which will then transmit the audio data to the earbuds. This means that a user can leave the handset on a desk in one room and hear the audio in the earbuds (or continue a phone call) in another room that is outside of the normal Bluetooth range (but within the range of the AP). In this way, a user does not need to carry the handset throughout the home or office to use wireless earbuds.

Example 600 shows an XPAN topology where the handset device may communicate with peripheral devices (e.g., earbuds (EB)) or other STAs as part of a peer-to-peer (P2P) link that uses low energy (LE) protocols (e.g., BLE protocols). With P2P, the handset sends Wi-Fi information to the earbuds vie BLE and the earbuds can use Wi-Fi. The handset device may provide communications between the peripheral devices and an AP. The handset has a Wi-Fi direct link to the AP. There may not be any EB direct measurements and thus the handset may infer such EB statistics. There may be a one layer to two layer (1L2) flow or a one layer to four layer (1L4) flow in uplink or downlink. Communications may be target wake time (TWT)-based with synchronized end-to-end (E2E) timing. TWT involves the use of a schedule for waking up to communicate and powering down to conserve power. This XPAN topology may obtain optimal power and concurrency performance.

Example 602 shows an XPAN topology with communications between a handset and earbuds over one AP. There may be control information or a switching request that uses Wi-Fi transmission control protocol (TCP) or a Glink. Audio and earbud latency statistics may be provided over a Wi-Fi direct link, and there may be direct earbud statistics collection. There may be a 1L2 flow or a two layer to four layer (2L4) flow. The E2E timing may not be synchronized.

Example 604 shows an XPAN topology that involves an AP-to-AP link, where the APs use the same subnet or a different subnet. The handset and earbuds may communicate over two or more APs. The earbuds may roam, and the AP mesh network manages the link. The E2E timing is not synchronized. This XPAN topology may have more latency and consume more power than other XPAN topologies.

Example 606 shows an XPAN topology that involves links from an application server to earbuds through a handset (STA) or an AP. The link a from the application server to the handset may be Wi-Fi or cellular. The P2P link ag from the handset to the earbuds may be Wi-Fi 6G/5G/2G or BLE. The link by from the handset to the AP may be Wi-Fi or cellular. The link $b_2$ and $b_3$ can be 6G/5G/2G.

When neither the central device (e.g., handset, AP) nor the earbuds support TWT, the earbuds may use power management signals to conserve power. The central device may receive a power management (PM) signal (e.g., PM0) indicating that the earbuds are ready to power up, activate, or wake up, and a PM signal (e.g., PM1) indicating that the earbuds are to power down. When the earbuds wake up to retrieve traffic from the central device, the earbuds do not know the end of the traffic burst accumulated at the central device. Therefore, the earbuds may implement an inactivity time out (ITO) mechanism. ITO is a period of time that the earbuds will be active in anticipation of packet reception from the central device. ITO may increase power consumption on the earbuds and hence reduces the battery life of the earbuds, resulting in a poorer user experience.

As indicated above, FIG. 6 is provided as an example. Other examples may differ from what is described with regard to FIG. 6.

Figure 7:
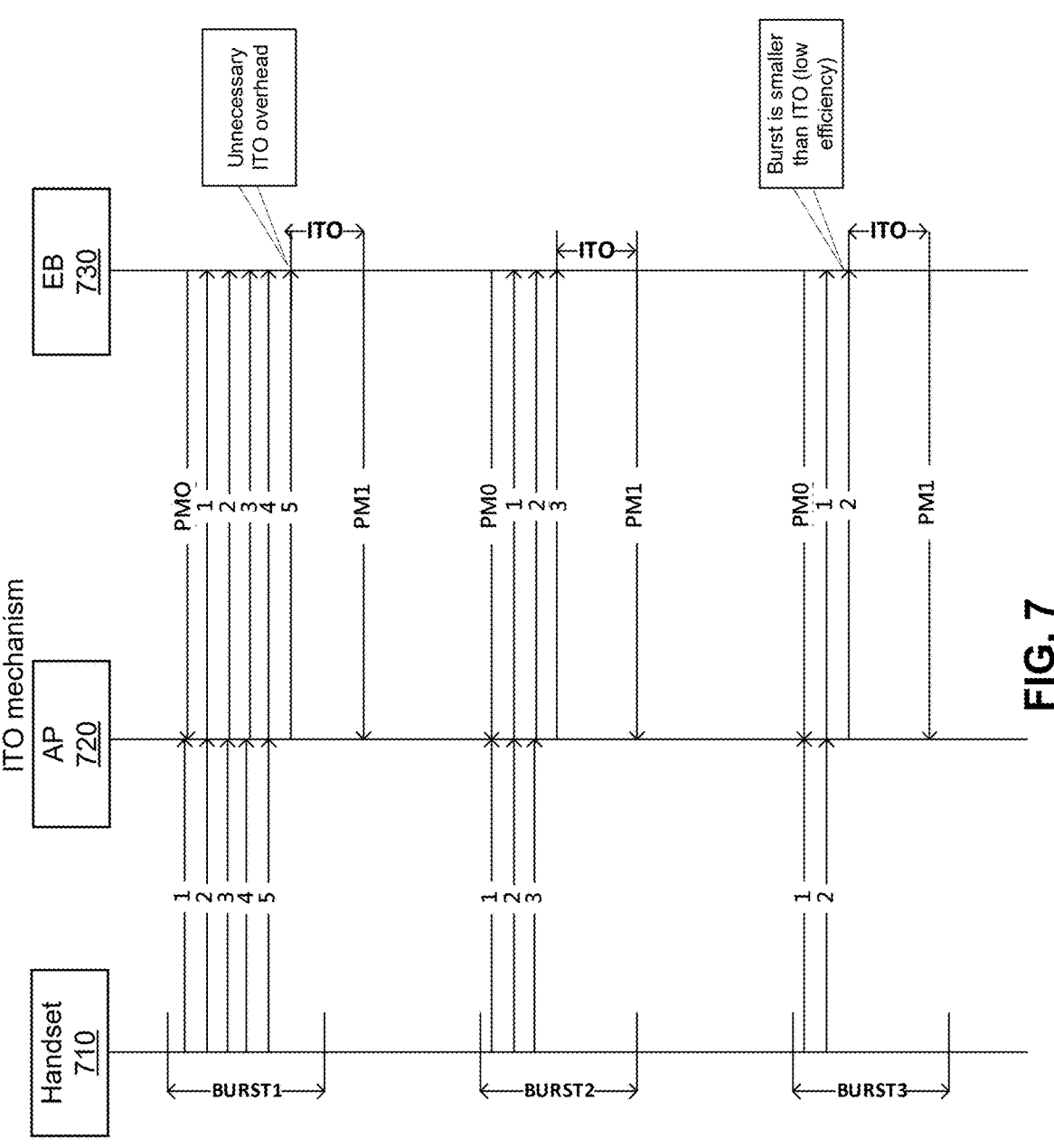
FIG. 7 is a diagram illustrating an example of an inactivity time out (ITO) mechanism, in accordance with the present disclosure.

FIG. 7 is a diagram illustrating an example 700 of an ITO mechanism, in accordance with the present disclosure. A central device, such as a handset 710, may transmit traffic bursts of audio packets at periodic intervals via another central device (e.g., AP 720), to a peripheral device, such as an earbud 730. The earbud 730 may be a primary earbud that is paired with another earbud.

The AP 720 may indicate to the earbud 730 the buffered frames through a traffic incident management (TIM) bit in beacons. The earbud 730 may transmit a PM0. The AP 720 may deliver a burst of audio packets after receiving the PM0. The earbud 730 does not know when the end of the burst is to occur. Accordingly, the earbud 730 may implement the ITO mechanism to conserve power. The ITO mechanism may start after an audio packet and may include waiting 5 to 10 milliseconds (ms) and powering down if no audio packets are received during that time. The earbud 730 is expected be in an active state during the ITO duration.

Example 700 shows a third burst that is smaller than the ITO duration and thus the efficiency of the ITO mechanism is lower for the third burst. If the earbud 730 consumes more power than necessary, the earbud 730 may stop operating sooner than expected, which can lead to a poorer user experience.

As indicated above, FIG. 7 is provided as an example. Other examples may differ from what is described with regard to FIG. 7.

Figure 8:
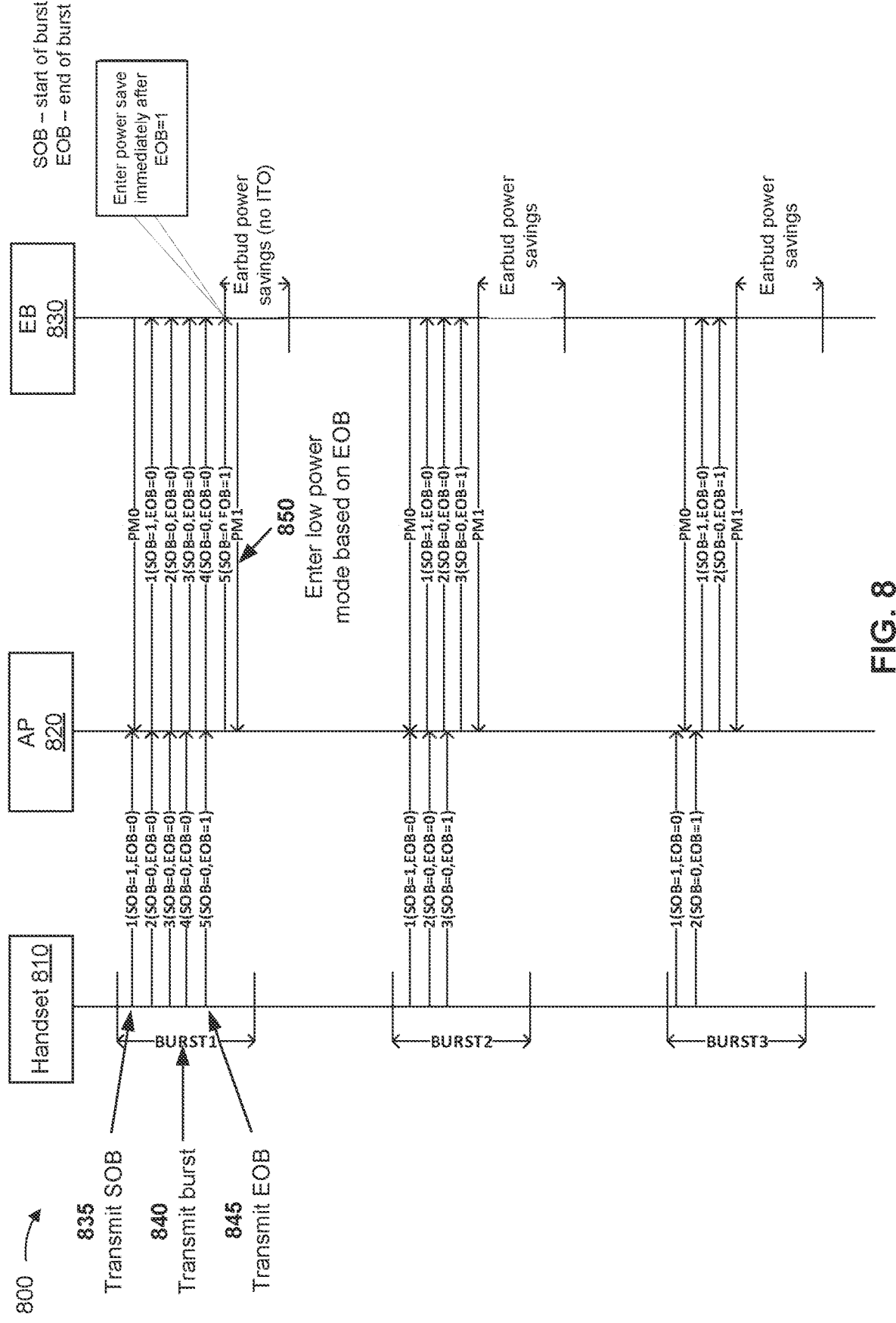
FIG. 8 is a diagram illustrating an example of using an end of burst (EOB) indication for a traffic burst, in accordance with the present disclosure.

FIG. 8 is a diagram illustrating an example 800 of using an EOB for a traffic burst, in accordance with the present disclosure. A central device (e.g., handset 810) may transmit traffic bursts of audio packets at periodic intervals via another central device (e.g., AP 820) to a peripheral device (e.g., earbud 830). The earbud (EB) 830 may be a primary earbud that is paired with another earbud.

According to various aspects described herein, the central device may indicate an SOB and an EOB in audio packets to the earbud 830. As an EOB indicates that there are no more packets for the burst, the earbud 830 may power down after the EOB rather than staying active for an ITO duration. By not staying active when there are no audio packets, the earbuds may conserve more power and extend the time that a user can enjoy WHC.

In some aspects, the SOB may be included in a real-time transport protocol (RTP) header, and the EOB may be included in an RTP header. The SOB and the EOB may be included in synchronization source fields of the RTP headers. In some aspects, the SOB may be included in an XPAN preamble, and the EOB may be included in an XPAN preamble. In some aspects, the earbud 830 may obtain other non-audio packets buffered at the AP 820 at regular listening or delivery traffic indication map (DTIM) intervals so that there is no issue with obtaining packets from the AP 820.

Example 800 shows transmission of an SOB and an EOB. The earbud 830 may transmit a PM0 message indicating a power on of the earbud 830. As shown by reference number 835, the handset 810 may transmit an SOB in a header of a first audio packet of a burst. As shown by reference number 840, the handset 810 may transmit the burst (the audio packets). As shown by reference number 845, the handset 810 may transmit an EOB in a header of the last audio packet of the burst. The earbud 830 may receive the SOB, the burst, and the EOB. As shown by reference number 850, the earbud 830 may enter a low power mode based at least in part on receiving the EOB. The low power mode may be a sleep mode, a less active mode, or another mode that consumes less power than what is used to monitor for and/or receive the burst. The earbud 830 may transmit a PM1 message indicating a power down of the earbud 830. The earbud 830 may enter the low power mode in less time than an ITO duration. As a result, the earbuds may conserve more power than the ITO mechanism.

As indicated above, FIG. 8 is provided as an example. Other examples may differ from what is described with regard to FIG. 8.

Figure 9:
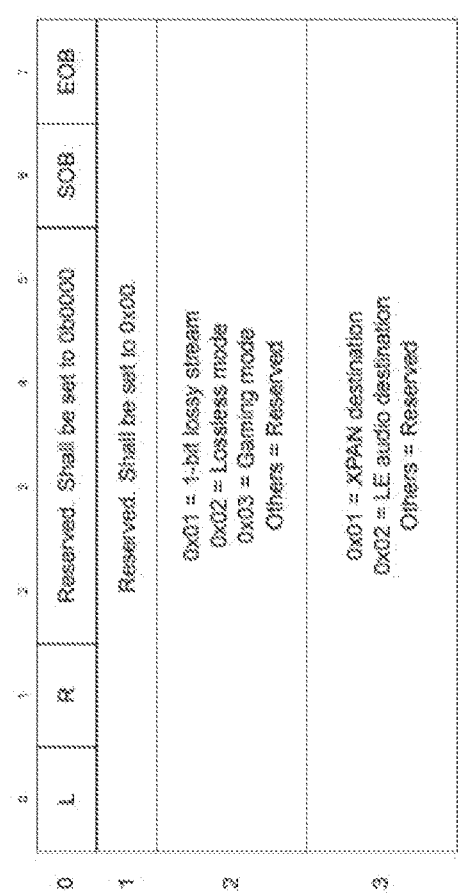
FIG. 9 is a diagram illustrating examples of real-time protocol headers, in accordance with the present disclosure.
Figure 9:
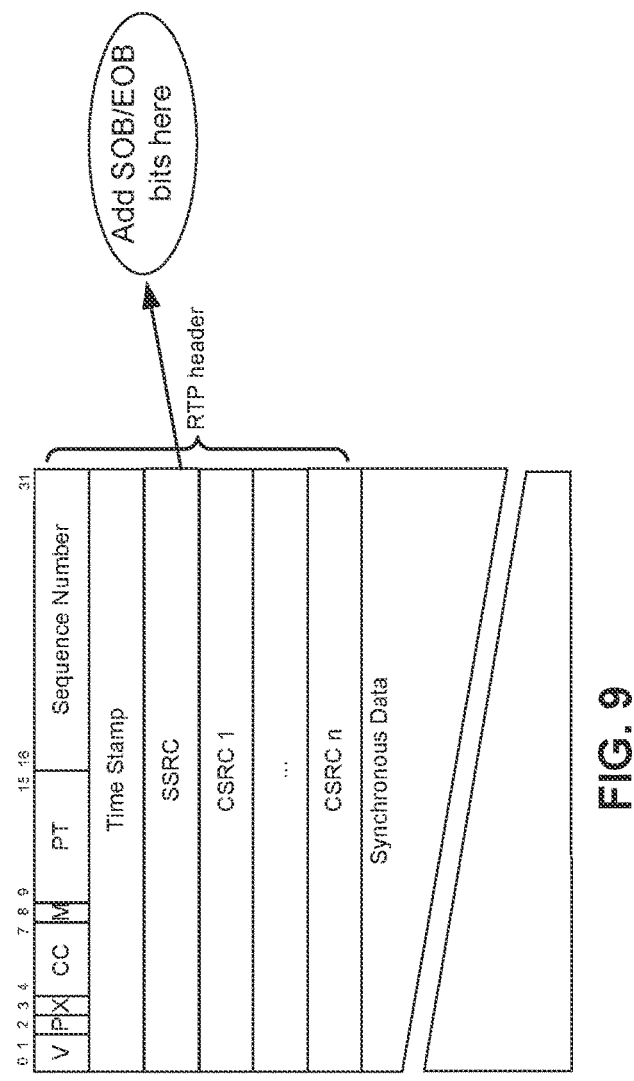

FIG. 9 is a diagram illustrating examples 900 and 902 of including an EOB or an SOB in RTP headers, in accordance with the present disclosure.

Example 900 shows an example of an SOB bit and an EOB bit in an RTP header. A 0 (zero) for the SOB bit may indicate no start of a burst, and a 1 may indicate a start of the burst. A 0 (zero) for the EOB bit may indicate no end of a burst, and a 1 may indicate an end of the burst. Example 902 shows a synchronization source (SSRC) field in an RTP header where SOB or EOB bits may reside.

As indicated above, FIG. 9 is provided as an example. Other examples may differ from what is described with regard to FIG. 9.

Figure 10:
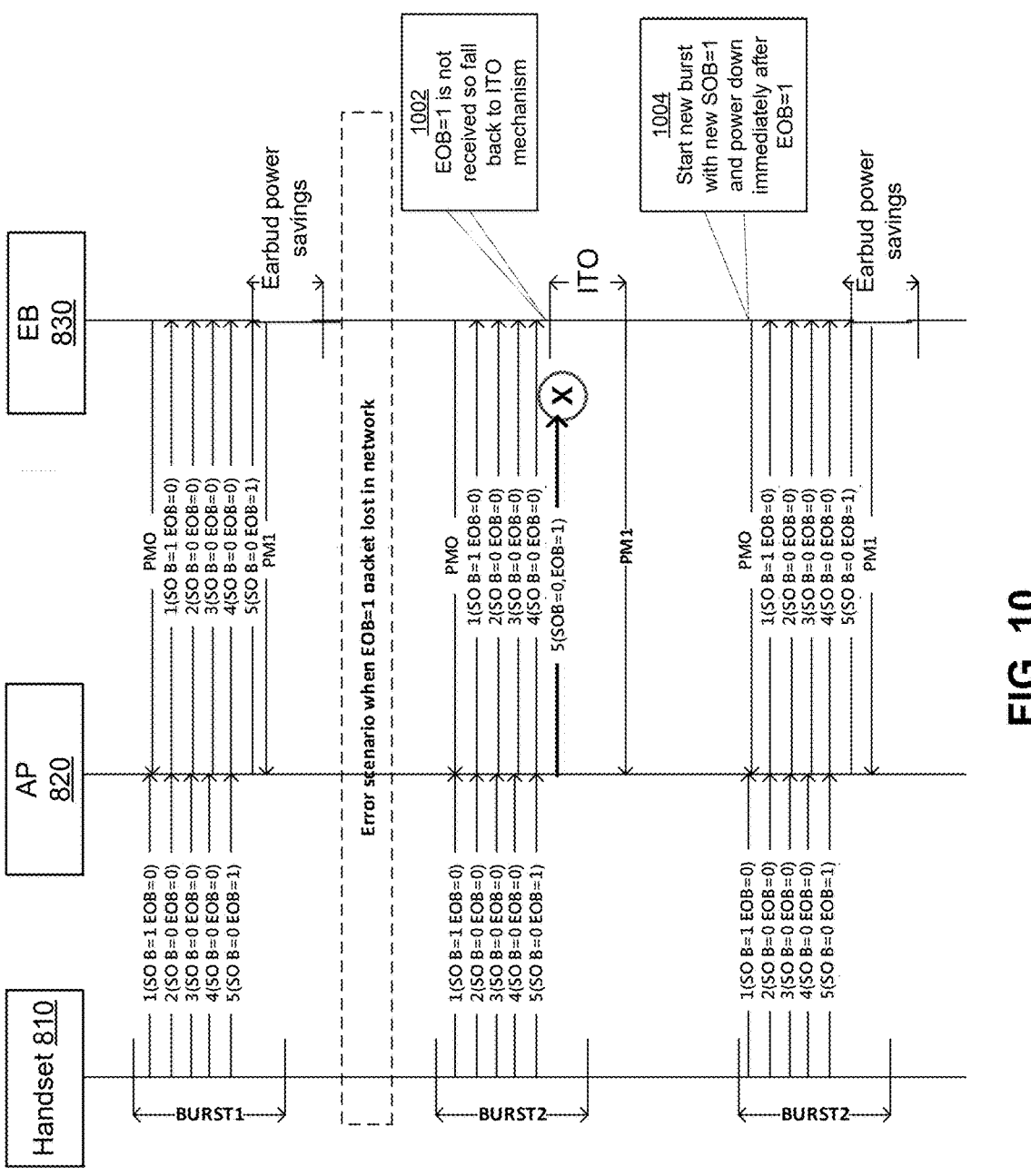
FIG. 10 is a diagram illustrating an example of using an EOB indication for a traffic burst, in accordance with the present disclosure.

FIG. 10 is a diagram illustrating an example 1000 of using an EOB for a traffic burst, in accordance with the present disclosure.

In a scenario, the earbud 830 may receive an SOB (SOB=1) with a first burst. However, the earbud 830 may not receive an EOB (EOB=1 packet or EOB indication) at an end of the first burst. This may be an error (shown by the "X" in example 1000) where the packet with the EOB=1 is lost in the network. It is possible that the EOB=1 packet is dropped due to a congested channel. In some aspects, as shown by reference number 1002, if the EOB=1 packet is not received at the earbud 830, the earbud 830 may fall back to a legacy ITO mechanism (e.g., shown in FIG. 7) to power down and transmit a PM1 message. The earbud 830 may power down if no audio packets or EOB=1 packet is received within a specified time duration.

In the next wakeup, if the SOB=1 packet is received for a second burst, the earbud 830 may reset its state to the start of a new burst, as shown by reference number 1004. The earbud 830 may power down immediately (e.g., not wait for an ITO time duration) after receiving an EOB=1 packet. Note that in this entire sequence, the packets may be delivered in order. That is, it may not be possible for packets to be out of order.

As indicated above, FIG. 10 is provided as an example. Other examples may differ from what is described with regard to FIG. 10.

Figure 11:
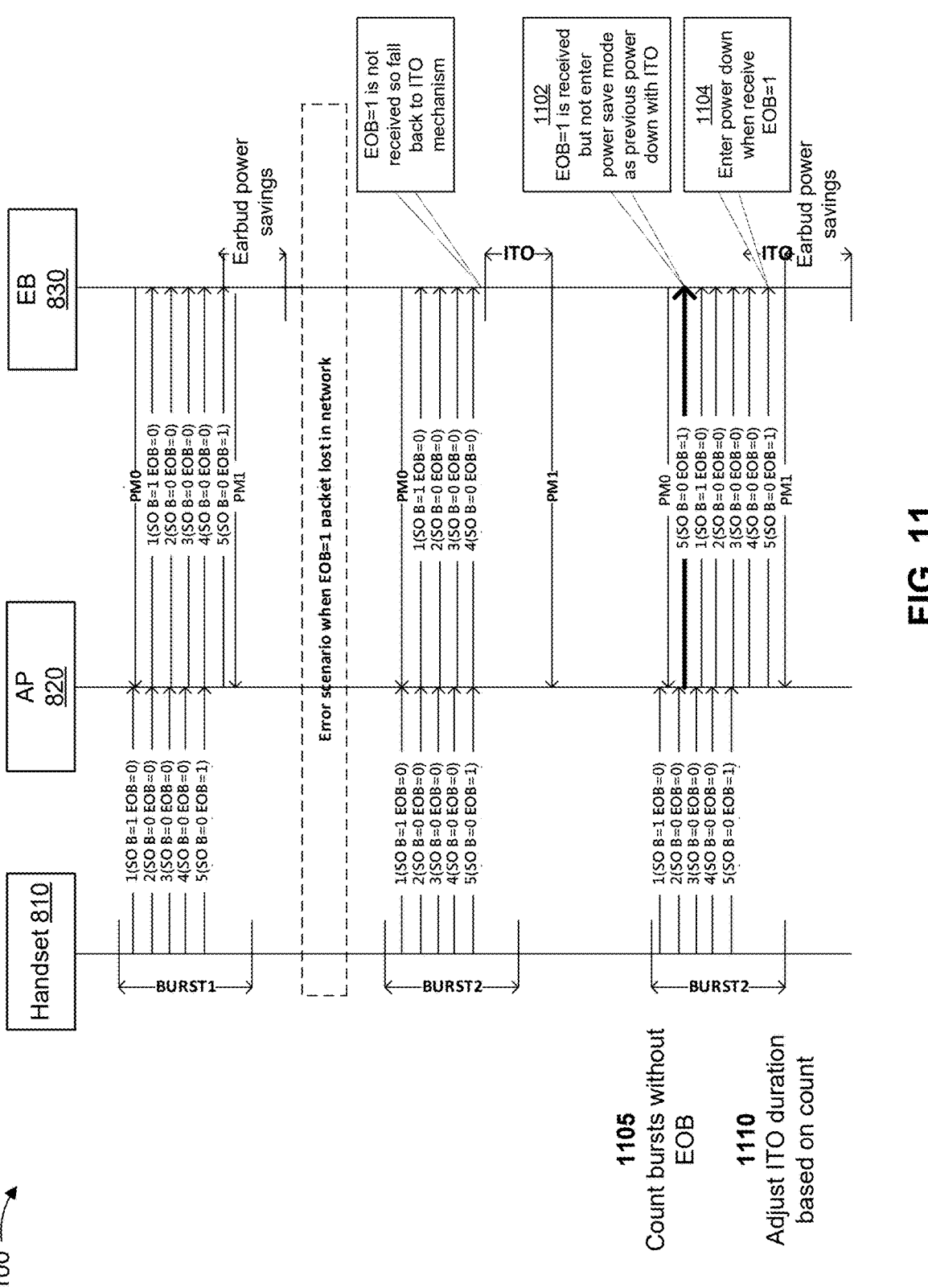
FIG. 11 is a diagram illustrating an example of using an EOB indication for a traffic burst, in accordance with the present disclosure.

FIG. 11 is a diagram illustrating an example 1100 of using an EOB for a traffic burst, in accordance with the present disclosure.

In another scenario, the EOB=1 packet may not be lost but may be received late. The EOB=1 packet can arrive at the earbud 830 at the next interval due to latencies in the network. In this scenario, the earbud 830 may fall back to an ITO mechanism after the first burst. In a next interval, the earbud 830 may prepare to receive a second burst. If the earbud 830 receives an EOB=1 packet, the earbud 830 may recognize that the EOB=1 packet is for the first burst and may not immediately enter a power save mode, as shown by reference number 1102. The earbud 830 may receive the SOB for the second burst, receive the second burst, and then receive the EOB=1 for the second burst. As shown by reference number 1104, the earbud 830 may enter the power save mode immediately after receiving the EOB=1 for the second burst.

In some aspects, the earbud 830 may track the quantity of bursts that were received without the EOB (EOB=1 packet) to infer how may bursts are pending at the central device (e.g., pending_EoB_packet_counter). As shown by reference number 1105, the earbud 830 may count the quantity of bursts without an EOB. As shown by reference number 1110, the earbud 830 may adjust the ITO duration based at least in part on the count. For example, the earbud 830 may adapt the length of the ITO duration as a function of pending_EoB_packet_counter. The higher the count, the longer the ITO duration, up to an upper limit for the ITO duration. The value of the pending_EoB_packet_counter may be close to 0 in a steady state. The upper limit for the ITO duration may be based at least in part on a power status (e.g., battery level, energy harvesting rate, energy usage rate) of the earbud 830 and/or a latency parameter (e.g., quality of service (QoS), latency requirement) of the earbud 830. The ITO duration may be set as part of a tradeoff between energy savings and communication latency. In this way, the earbud 830 has more flexibility to save power or to improve communications.

As indicated above, FIG. 11 is provided as an example. Other examples may differ from what is described with regard to FIG. 11.

Figure 12:
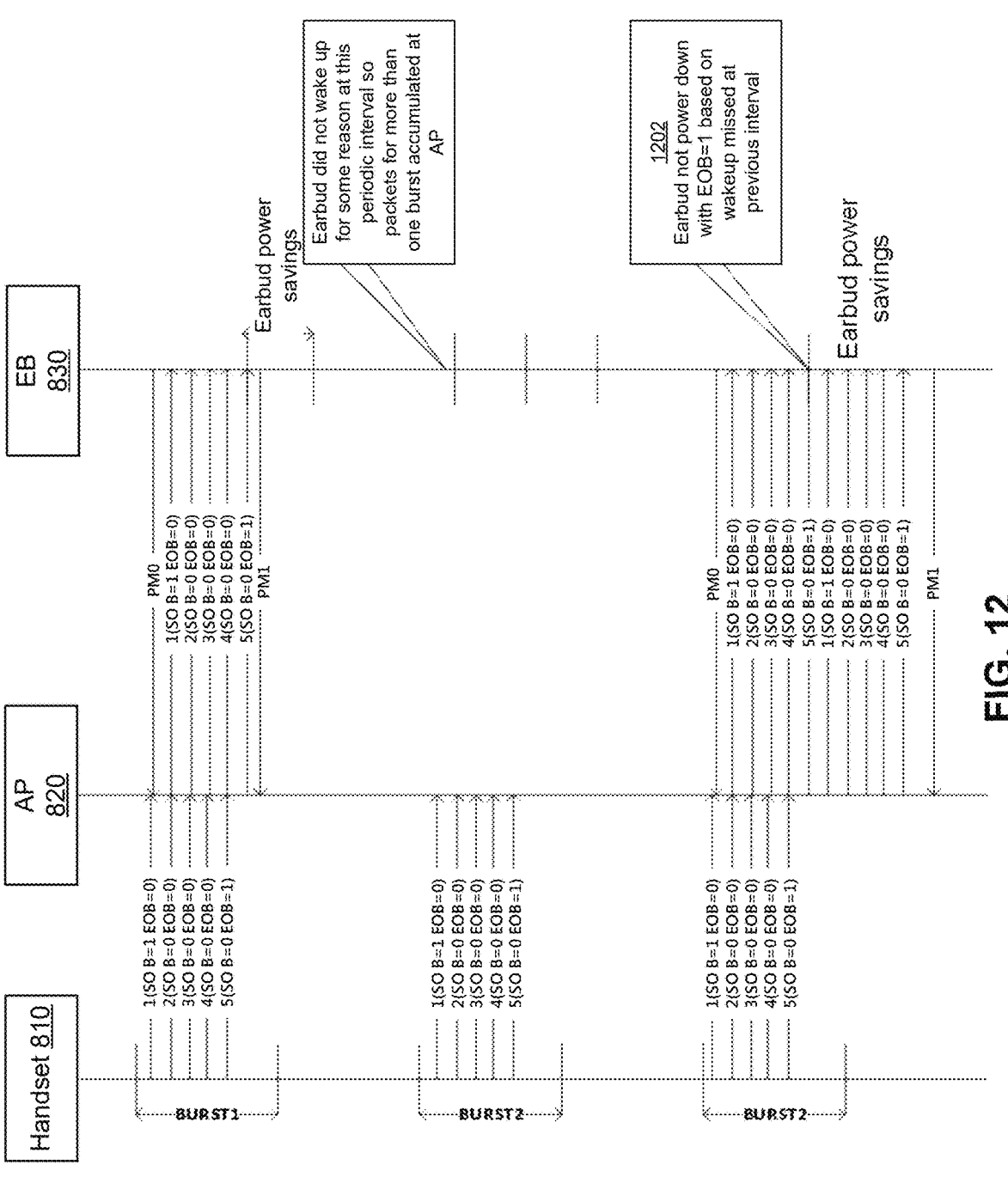
FIG. 12 is a diagram illustrating an example of using an EOB indication for a traffic burst, in accordance with the present disclosure.

FIG. 12 is a diagram illustrating an example 1200 of using an EOB for a traffic burst, in accordance with the present disclosure.

In a scenario, the earbud 830 may not wake up at a periodic interval. If the earbud 830 did not (e.g., could not) wake up at an agreed periodic interval, there is a chance that more bursts may accumulate at the central device depending on, for example, AP 820's schedule, a quantity of clients associated with the AP 820, the load of the clients, and so forth. In this scenario, the earbud 830 may not power down immediately after the first EOB=1 packet as there are more frames accumulated at the AP 820. As shown by reference number 1202 if the earbud 830 missed the wakeup in an earlier parodic interval, the earbud 830 may wait for more audio packets from the AP 820 before powering down. In some aspects, the earbud 830 may track how many bursts are skipped and wait to receive the same quantity of EOB=1 packets or employ an ITO. This is a conservative approach since the AP 820 may not have all bursts with EOB=1 packets ready when the earbud 830 wakes up.

In some aspects, the earbud 830 may receive a second SOB (SOB=1 or SOB indication), receive the second burst, and receive an EOB for the second burst. The earbud 830 may refrain from entering a low power mode based at least in part on a determination that the earbud 830 skipped a wake up interval between a first EOB and the second SOB. The earbud 830 may enter the low power mode based at least in part on receiving a quantity of EOBs that corresponds to a quantity of missed wake up intervals. The second specified time duration may be based at least in part on a history or average of pending packets that may accumulate before an EOB is received for a burst.

In some aspects, the earbud 830 may check a second specified time duration, such as a time-to-live (TTL) field inside the RTP packet. If the TTL is small (e.g., below a certain threshold), the earbud 830 may conclude that these packets are from past burst(s) and thus may not power down. For example, the earbud 830 may receive a second SOB that indicates a start of a second burst, receive the second burst, and receive a second EOB that indicates an end of the second burst. The earbud 830 may refrain from entering a low power mode based at least in part on a TTL value in a packet associated with the second burst satisfying a threshold.

In another scenario, the earbud 830 may not receive an SOB on time. The earbud 830 may receive an EOB for a first burst and, at a start of a second burst, the earbud 830 may not receive an SOB. The AP 820 may repeat the transmission of the SOB for one or more retries. If the SOB happens to be in the same packet as the EOB (e.g., single packet per traffic burst), the earbud 830 may fall back to the legacy ITO mechanism to power down. If the SOB is not in the same packet as the EOB, the earbud 830 may operate as explained above in the other scenarios.

If the last EOB was not received, when the missed last EOB arrives in the current burst, the earbud 830 may not enter the power save mode until the earbud 830 receives the new EOB, whether or not an SOB indication is received. Note that in this scenario, the SOB may not have a direct impact on the earbud 830 power save mode.

In some aspects, the earbud 830 may receive a second burst without receiving a second SOB that indicates a start of the second burst. The earbud 830 may receive the second SOB after the second burst has started. The earbud 830 may enter a low power mode based at least in part on not receiving, within a first specified time duration, a second EOB that indicates an end of the second burst.

As indicated above, FIG. 12 is provided as an example. Other examples may differ from what is described with regard to FIG. 12.

Figure 13:
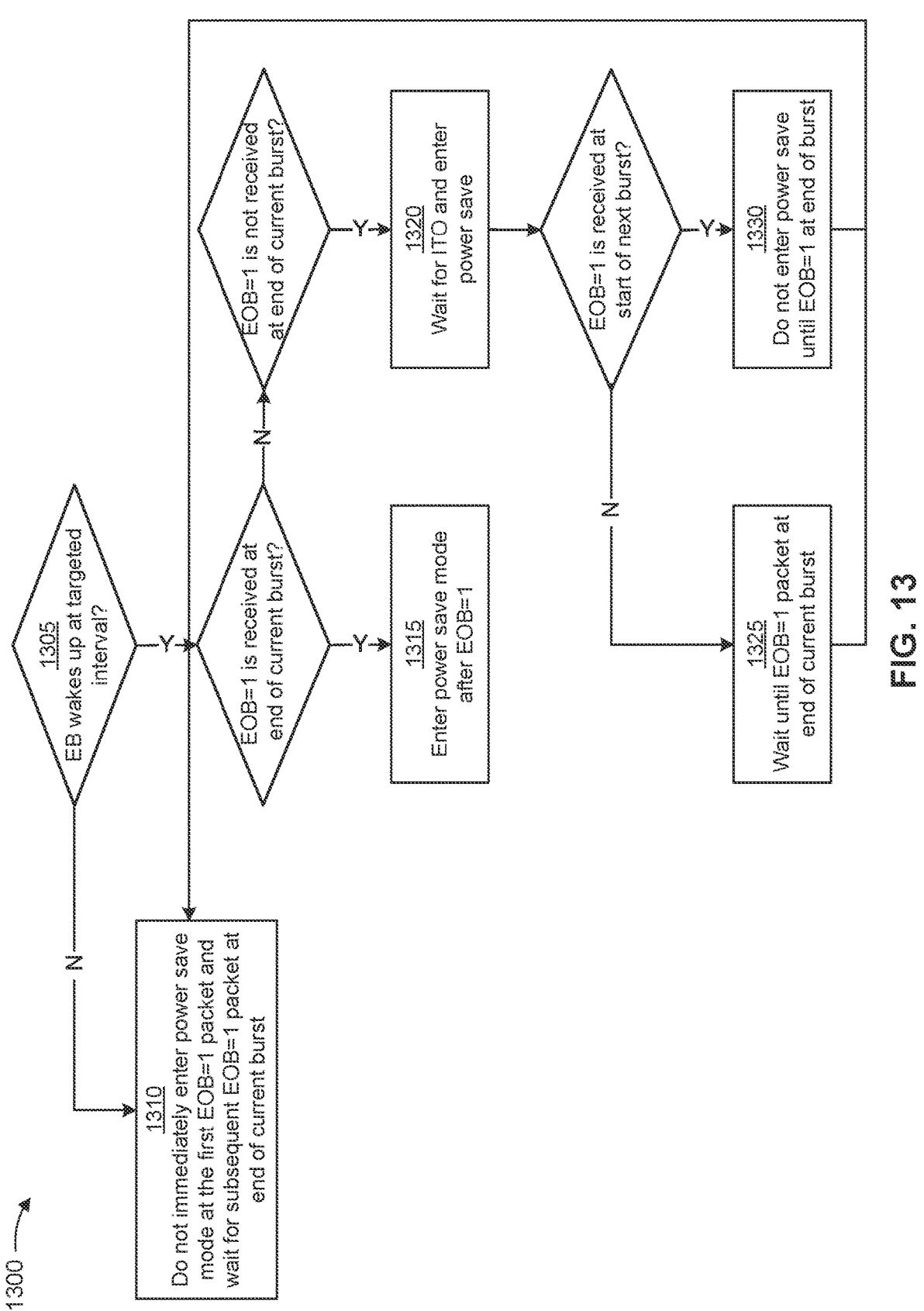
FIG. 13 is a diagram illustrating an example of using an EOB indication, in accordance with the present disclosure.

FIG. 13 is a diagram illustrating an example 1300 of using an EOB indication, in accordance with the present disclosure.

Example 1300 is a flow chart of actions that an earbud (e.g., earbud 830) may take upon receiving or not receiving an EOB. As shown by reference number 1305, the earbud may wake up at a targeted interval. The targeted interval may be one of multiple periodic intervals at which the earbud 830 is active to receive a burst of audio packets. If the earbud does not wake up at the targeted interval, as shown by reference number 1310, the earbud may not immediately enter a power save mode at the first EOB=1 packet that is received and may wait for a subsequent EOB=1 packet at the end of the current burst. The earbud may wait for a specified time duration after the first EOB=1 packet to determine if audio packets of the current burst are received right away. In this way, the earbud does not power down in the middle of receiving a burst just because the earbud was not awake and/or did not receive an EOB for a previous burst.

As shown by reference number 1315, if the earbud does wake up at the targeted interval and the EOB=1 packet is received at an end of the current burst, the earbud may enter a power save mode after the EOB=1 packet. As shown by reference number 1320, if the EOB=1 packet is not received at the end of the current burst, the earbud may wait for an ITO duration before entering the power save mode. As shown by reference number 1325, if the EOB=1 packet is not received at a start of the next burst, the earbud may wait until the EOB=1 packet is received at the end of the current burst. As shown by reference number 1330, if the EOB=1 is received at the start of the next burst, the earbud may not enter the power save mode until another EOB=1 is received at the end of the next burst.

By using an EOB to power down earlier than an ITO mechanism, while accounting for different scenarios where an EOB may not be received when expected, earbuds may conserve power and improve battery time.

As indicated above, FIG. 13 is provided as an example. Other examples may differ from what is described with regard to FIG. 13.

Figure 14:
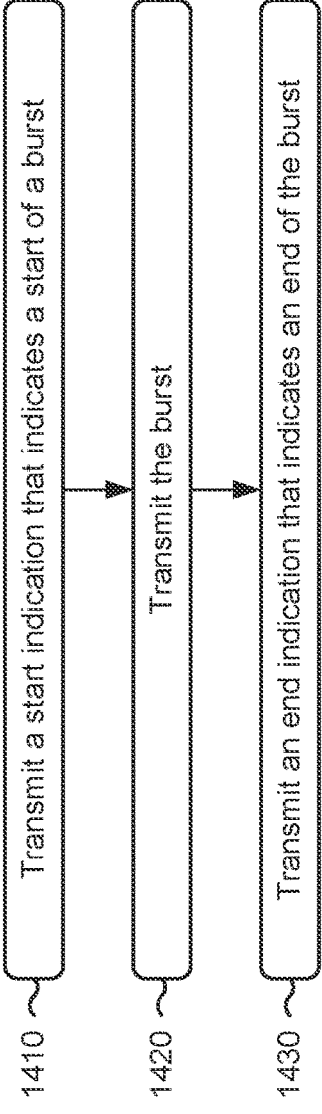
FIG. 14 is a diagram illustrating an example process performed, for example, by a central device, in accordance with the present disclosure.

FIG. 14 is a diagram illustrating an example process 1400 performed, for example, by a central device, in accordance with the present disclosure. Example process 1400 is an example where the central device (e.g., central device 102, handset, UE, STA, AP) performs operations associated with end of burst indications.

As shown in FIG. 14, in some aspects, process 1400 may include transmitting a start indication (SOB=1) that indicates a start of a burst (block 1410). For example, the central device (e.g., using transmission component 1604 and/or communication manager 1606, depicted in FIG. 16) may transmit a start indication that indicates a start of a burst, as described above.

As further shown in FIG. 14, in some aspects, process 1400 may include transmitting the burst (block 1420). For example, the central device (e.g., using transmission component 1604 and/or communication manager 1606, depicted in FIG. 16) may transmit the burst, as described above.

As further shown in FIG. 14, in some aspects, process 1400 may include transmitting an end indication (EOB=1) that indicates an end of the burst (block 1430). For example, the central device (e.g., using transmission component 1604 and/or communication manager 1606, depicted in FIG. 16) may transmit an end indication that indicates an end of the burst, as described above.

Process 1400 may include additional aspects, such as any single aspect or any combination of aspects described below and/or in connection with one or more other processes described elsewhere herein.

In a first aspect, transmitting the start indication includes transmitting the start indication to a peripheral device via an access point, and transmitting the end indication includes transmitting the end indication to the peripheral device via the access point.

In a second aspect, alone or in combination with the first aspect, the end indication is included in an RTP header.

In a third aspect, alone or in combination with one or more of the first and second aspects, the end indication is included in a synchronization source field of the RTP header.

In a fourth aspect, alone or in combination with one or more of the first through third aspects, the start indication and the end indication are included in an XPAN preamble.

In a fifth aspect, alone or in combination with one or more of the first through fourth aspects, process 1400 includes repeating transmission of the start indication.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
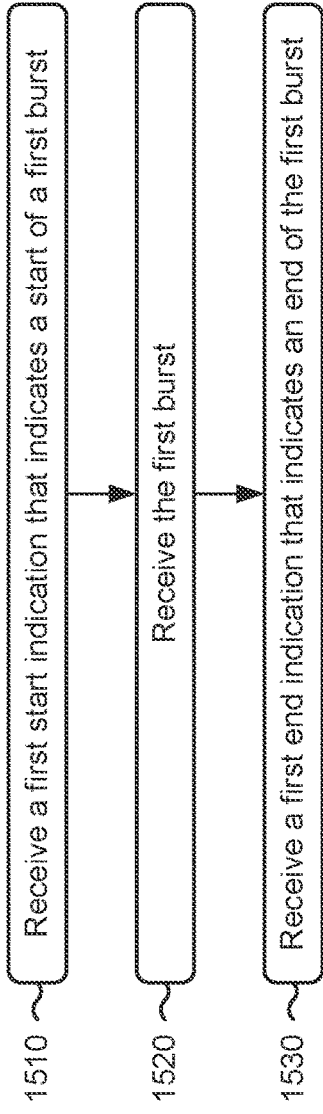
FIG. 15 is a diagram illustrating an example process performed, for example, by a peripheral device, in accordance with the present disclosure.

FIG. 15 is a diagram illustrating an example process 1500 performed, for example, by a peripheral device, in accordance with the present disclosure. Example process 1500 is an example where the peripheral device (e.g., peripheral device 112, earbud, wearable device, portable speaker) performs operations associated with end of burst indication.

As shown in FIG. 15, in some aspects, process 1500 may include receiving a first start indication that indicates a start of a first burst (block 1510). For example, the peripheral device (e.g., using reception component 1702 and/or communication manager 1706, depicted in FIG. 17) may receive a first start indication that indicates a start of a first burst, as described above.

As further shown in FIG. 15, in some aspects, process 1500 may include receiving the first burst (block 1520). For example, the peripheral device (e.g., using reception component 1702 and/or communication manager 1706, depicted in FIG. 17) may receive the first burst, as described above.

As further shown in FIG. 15, in some aspects, process 1500 may include receiving a first end indication that indicates an end of the first burst (block 1530). For example, the peripheral device (e.g., using reception component 1702 and/or communication manager 1706, depicted in FIG. 17) may receive a first end indication that indicates an end of the first burst, as described above.

Process 1500 may include additional aspects, such as any single aspect or any combination of aspects described below and/or in connection with one or more other processes described elsewhere herein.

In a first aspect, process 1500 includes entering a low power mode based at least in part on receiving the first end indication.

In a second aspect, alone or in combination with the first aspect, process 1500 includes receiving a second start indication that indicates a start of a second burst, receiving the second burst, and entering a low power mode based at least in part on not receiving, within a first specified time duration, audio packets or a second end indication that indicates an end of the second burst.

In a third aspect, alone or in combination with one or more of the first and second aspects, process 1500 includes counting a quantity of bursts received without an end indication, and adjusting the first specified time duration based at least in part on the quantity of bursts.

In a fourth aspect, alone or in combination with one or more of the first through third aspects, process 1500 includes adjusting the first specified time duration based at least in part on one or more of a power status of the peripheral device or a latency parameter of the peripheral device.

In a fifth aspect, alone or in combination with one or more of the first through fourth aspects, process 1500 includes receiving a second end indication that indicates an end of the second burst, receiving a third start indication that indicates a start of a third burst, and refraining from entering a low power mode based at least in part on the third start indication being received within a second specified time duration after the second end indication.

In a sixth aspect, alone or in combination with one or more of the first through fifth aspects, the second specified time duration is based at least in part on a history or average of pending packets before an end indication is received for a burst.

In a seventh aspect, alone or in combination with one or more of the first through sixth aspects, process 1500 includes receiving a second start indication that indicates a start of a second burst, receiving the second burst, receiving a second end indication that indicates an end of the second burst, and refraining from entering a low power mode based at least in part on a determination that the peripheral device skipped a wake up interval between the first end indication and the second start indication.

In an eighth aspect, alone or in combination with one or more of the first through seventh aspects, process 1500 includes entering the low power mode based at least in part receiving a quantity of end indications that corresponds to a quantity of missed wake up intervals.

In a ninth aspect, alone or in combination with one or more of the first through eighth aspects, process 1500 includes receiving a third start indication that indicates a start of a third burst, receiving the third burst, and receiving a third end indication that indicates an end of the third burst.

In a tenth aspect, alone or in combination with one or more of the first through ninth aspects, process 1500 includes receiving a second start indication that indicates a start of a second burst, receiving the second burst, receiving a second end indication that indicates an end of the second burst, and refraining from entering a low power mode based at least in part on a TTL value in a packet associated with the second burst satisfying a threshold.

In an eleventh aspect, alone or in combination with one or more of the first through tenth aspects, process 1500 includes receiving a second start indication that indicates a start of a second burst, receiving the second burst, receiving a second end indication that indicates an end of the second burst, and refraining from entering a low power mode before a third burst is received, based at least in part on a determination that the peripheral device skipped a wake up interval between the first end indication and the second start indication.

In a twelfth aspect, alone or in combination with one or more of the first through eleventh aspects, process 1500 includes receiving a second burst without receiving a second start indication that indicates a start of the second burst, receiving the second start indication after the second burst has started, and entering a low power mode based at least in part on not receiving, within a first specified time duration, a second end indication that indicates an end of the second burst.

In a thirteenth aspect, alone or in combination with one or more of the first through twelfth aspects, the first end indication is included in an RTP header.

In a fourteenth aspect, alone or in combination with one or more of the first through thirteenth aspects, the first end indication is included in a synchronization source field of the RTP header.

In a fifteenth aspect, alone or in combination with one or more of the first through fourteenth aspects, the first end indication is included in an XPAN preamble.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
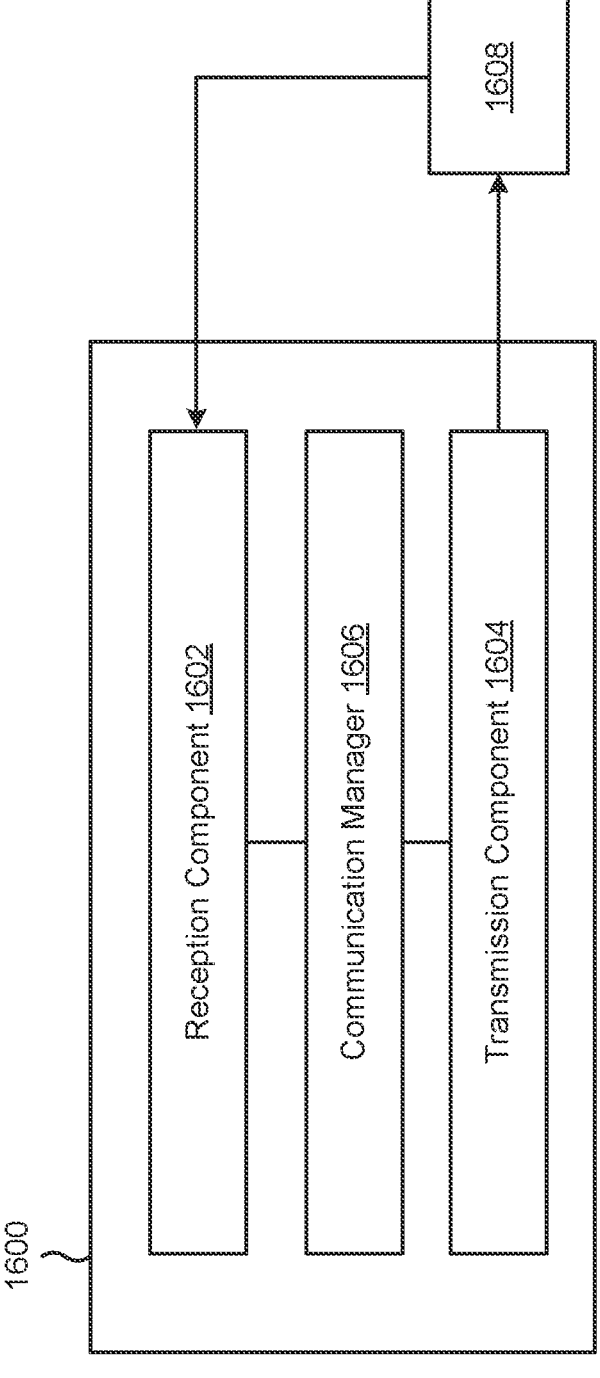
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a central device (e.g., central device 102, handset, UE, STA, AP), or a central device may include the apparatus 1600. In some aspects, the apparatus 1600 includes a reception component 1602, a transmission component 1604, and/or a communication manager 1606, which may be in communication with one another (for example, via one or more buses and/or one or more other components). In some aspects, the communication manager 1606 manager is the WPAN controller 252 described in connection with FIG. 2.

In some aspects, the apparatus 1600 may be configured to perform one or more operations described herein in connection with FIGS. 1-13. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the central device described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1608. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a multiple-input multiple-output (MIMO) detector, a receive processor, a controller/processor, a memory, or a combination thereof, of the central device described in connection with FIG. 2.

The transmission component 1604 may transmit communications, such as reference signals, control information, data communications, or a combination thereof, to the apparatus 1608. In some aspects, one or more other components of the apparatus 1600 may generate communications and may provide the generated communications to the transmission component 1604 for transmission to the apparatus 1608. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1604 may include one or more antennas, a modem, a modulator, a transmit MIMO processor, a transmit processor, a controller/processor, a memory, or a combination thereof, of the central device described in connection with FIG. 2. In some aspects, the transmission component 1604 may be co-located with the reception component 1602 in a transceiver.

The communication manager 1606 may support operations of the reception component 1602 and/or the transmission component 1604. For example, the communication manager 1606 may receive information associated with configuring reception of communications by the reception component 1602 and/or transmission of communications by the transmission component 1604. Additionally, or alternatively, the communication manager 1606 may generate and/or provide control information to the reception component 1602 and/or the transmission component 1604 to control reception and/or transmission of communications.

The transmission component 1604 may transmit a start indication that indicates a start of a burst. The transmission component 1604 may transmit the burst. The transmission component 1604 may transmit an end indication that indicates an end of the burst. The communication manager 1606 may repeat transmission of the start indication.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
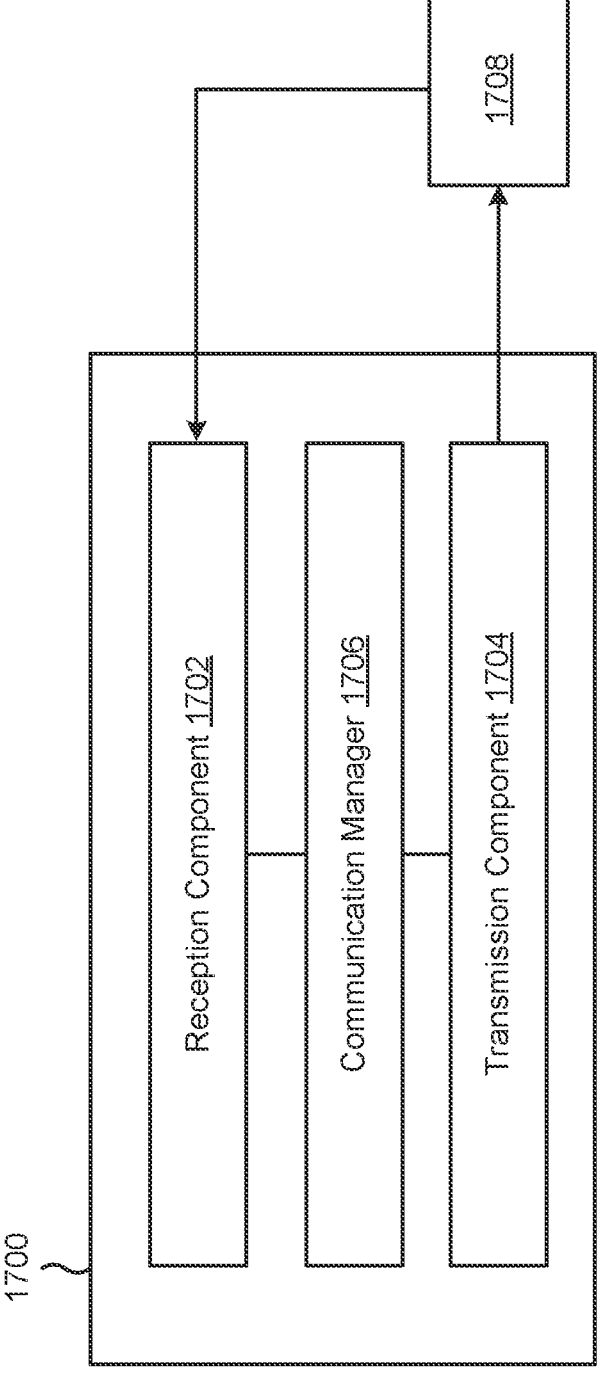
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a peripheral device (e.g., earbud, wearable device, portable speaker), or a peripheral device may include the apparatus 1700. In some aspects, the apparatus 1700 includes a reception component 1702, a transmission component 1704, and/or a communication manager 1706, which may be in communication with one another (for example, via one or more buses and/or one or more other components). In some aspects, the communication manager 1706 is the WPAN controller 252 described in connection with FIG. 2.

In some aspects, the apparatus 1700 may be configured to perform one or more operations described herein in connection with FIGS. 1-13. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the peripheral device described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1708. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a receive processor, a controller/processor, a memory, or a combination thereof, of the peripheral device described in connection with FIG. 2.

The transmission component 1704 may transmit communications, such as reference signals, control information, data communications, or a combination thereof, to the apparatus 1708. In some aspects, one or more other components of the apparatus 1700 may generate communications and may provide the generated communications to the transmission component 1704 for transmission to the apparatus 1708. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1708. In some aspects, the transmission component 1704 may include one or more antennas, a transmit processor, a controller/processor, a memory, or a combination thereof, of the peripheral device described in connection with FIG. 2. In some aspects, the transmission component 1704 may be co-located with the reception component 1702 in a transceiver.

The communication manager 1706 may support operations of the reception component 1702 and/or the transmission component 1704. For example, the communication manager 1706 may receive information associated with configuring reception of communications by the reception component 1702 and/or transmission of communications by the transmission component 1704. Additionally, or alternatively, the communication manager 1706 may generate and/or provide control information to the reception component 1702 and/or the transmission component 1704 to control reception and/or transmission of communications.

The reception component 1702 may receive a first start indication that indicates a start of a first burst. The reception component 1702 may receive the first burst. The reception component 1702 may receive a first end indication that indicates an end of the first burst. The communication manager 1706 may enter a low power mode based at least in part on receiving the first end indication.

The reception component 1702 may receive a second start indication that indicates a start of a second burst. The reception component 1702 may receive the second burst. The communication manager 1706 may enter a low power mode based at least in part on not receiving, within a first specified time duration, audio packets or a second end indication that indicates an end of the second burst. The communication manager 1706 may count a quantity of bursts received without an end indication. The communication manager 1706 may adjust the first specified time duration based at least in part on the quantity of bursts. The communication manager 1706 may adjust the first specified time duration based at least in part on one or more of a power status of the peripheral device or a latency parameter of the peripheral device. The reception component 1702 may receive a second end indication that indicates an end of the second burst.

The reception component 1702 may receive a third start indication that indicates a start of a third burst. The communication manager 1706 may refrain from entering a low power mode based at least in part on the third start indication being received within a second specified time duration after the second end indication.

The reception component 1702 may receive a second start indication that indicates a start of a second burst. The reception component 1702 may receive the second burst. The reception component 1702 may receive a second end indication that indicates an end of the second burst.

The communication manager 1706 may refrain from entering a low power mode based at least in part on a determination that the peripheral device skipped a wake up interval between the first end indication and the second start indication. The communication manager 1706 may enter the low power mode based at least in part receiving a quantity of end indications that corresponds to a quantity of missed wake up intervals.

The reception component 1702 may receive a third start indication that indicates a start of a third burst. The reception component 1702 may receive the third burst. The reception component 1702 may receive a third end indication that indicates an end of the third burst.

The reception component 1702 may receive a second start indication that indicates a start of a second burst. The reception component 1702 may receive the second burst. The reception component 1702 may receive a second end indication that indicates an end of the second burst. The communication manager 1706 may refrain from entering a low power mode based at least in part on a TTL value in a packet associated with the second burst satisfying a threshold.

The reception component 1702 may receive a second start indication that indicates a start of a second burst. The reception component 1702 may receive the second burst. The reception component 1702 may receive a second end indication that indicates an end of the second burst. The communication manager 1706 may refrain from entering a low power mode before a third burst is received, based at least in part on a determination that the peripheral device skipped a wake up interval between the first end indication and the second start indication. The reception component 1702 may receive a second burst without receiving a second start indication that indicates a start of the second burst. The reception component 1702 may receive the second start indication after the second burst has started.

The communication manager 1706 may enter a low power mode based at least in part on not receiving, within a first specified time duration, a second end indication that indicates an end of the second burst.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a central device, comprising: transmitting a start indication that indicates a start of a burst; transmitting the burst; and transmitting an end indication that indicates an end of the burst.

Aspect 2: The method of Aspect 1, wherein transmitting the start indication includes transmitting the start indication to a peripheral device via an access point, and wherein transmitting the end indication includes transmitting the end indication to the peripheral device via the access point.

Aspect 3: The method of any of Aspects 1-2, wherein the end indication is included in a real time transport protocol (RTP) header.

Aspect 4: The method of Aspect 3, wherein the end indication is included in a synchronization source field of the RTP header.

Aspect 5: The method of any of Aspects 1-4, wherein the start indication and the end indication are included in an extended personal area network (XPAN) preamble.

Aspect 6: The method of any of Aspects 1-5, further comprising repeating transmission of the start indication.

Aspect 7: A method of wireless communication performed by a peripheral device, comprising: receiving a first start indication that indicates a start of a first burst; receiving the first burst; and receiving a first end indication that indicates an end of the first burst.

Aspect 8: The method of Aspect 7, further comprising entering a low power mode based at least in part on receiving the first end indication.

Aspect 9: The method of Aspect 7, further comprising: receiving a second start indication that indicates a start of a second burst; receiving the second burst; and entering a low power mode based at least in part on not receiving, within a first specified time duration, audio packets or a second end indication that indicates an end of the second burst.

Aspect 10: The method of Aspect 9, further comprising: counting a quantity of bursts received without an end indication; and adjusting the first specified time duration based at least in part on the quantity of bursts.

Aspect 11: The method of Aspect 9, further comprising adjusting the first specified time duration based at least in part on one or more of a power status of the peripheral device or a latency parameter of the peripheral device.

Aspect 12: The method of Aspect 9, further comprising: receiving a second end indication that indicates an end of the second burst; receiving a third start indication that indicates a start of a third burst; and refraining from entering a low power mode based at least in part on the third start indication being received within a second specified time duration after the second end indication.

Aspect 13: The method of Aspect 12, wherein the second specified time duration is based at least in part on a history or average of pending packets before an end indication is received for a burst.

Aspect 14: The method of Aspect 7, further comprising: receiving a second start indication that indicates a start of a second burst; receiving the second burst; receiving a second end indication that indicates an end of the second burst; and refraining from entering a low power mode based at least in part on a determination that the peripheral device skipped a wake up interval between the first end indication and the second start indication.

Aspect 15: The method of Aspect 14, further comprising entering the low power mode based at least in part receiving a quantity of end indications that corresponds to a quantity of missed wake up intervals.

Aspect 16: The method of Aspect 14, further comprising: receiving a third start indication that indicates a start of a third burst; receiving the third burst; and receiving a third end indication that indicates an end of the third burst.

Aspect 17: The method of Aspect 7, further comprising: receiving a second start indication that indicates a start of a second burst; receiving the second burst; receiving a second end indication that indicates an end of the second burst; and refraining from entering a low power mode based at least in part on a time-to-live value in a packet associated with the second burst satisfying a threshold.

Aspect 18: The method of Aspect 7, further comprising: receiving a second start indication that indicates a start of a second burst; receiving the second burst; receiving a second end indication that indicates an end of the second burst; and refraining from entering a low power mode before a third burst is received, based at least in part on a determination that the peripheral device skipped a wake up interval between the first end indication and the second start indication.

Aspect 19: The method of Aspect 7, further comprising: receiving a second burst without receiving a second start indication that indicates a start of the second burst; receiving the second start indication after the second burst has started; and entering a low power mode based at least in part on not receiving, within a first specified time duration, a second end indication that indicates an end of the second burst.

Aspect 20: The method of any of Aspects 7-19, wherein the first end indication is included in a real time transport protocol (RTP) header.

Aspect 21: The method of Aspect 20, wherein the first end indication is included in a synchronization source field of the RTP header.

Aspect 22: The method of any of Aspects 7-21, wherein the first end indication is included in an extended personal area network (XPAN) preamble.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A peripheral device for wireless communication, comprising:
   one or more memories; and
   one or more processors, coupled to the one or more memories, configured to cause the peripheral device to:
   receive a first start indication that indicates a start of a first burst;
   receive the first burst;
   receive a first end indication that indicates an end of the first burst;
   receive a second start indication that indicates a start of a second burst;
   receive the second burst;
   receive a second end indication that indicates an end of the second burst; and
   refrain from entering a low power mode based at least in part on a determination that the peripheral device skipped a wake up interval between the first end indication and the second start indication.

2. The peripheral device of claim 1, wherein the one or more processors are individually or collectively configured to cause the peripheral device to enter a low power mode based at least in part on receiving the first end indication.

3. The peripheral device of claim 1, wherein the one or more processors are individually or collectively configured to cause the peripheral device to:
   receive a second start indication that indicates a start of a second burst;

receive the second burst; and
enter a low power mode based at least in part on not receiving, within a first specified time duration, audio packets or a second end indication that indicates an end of the second burst.

4. The peripheral device of claim 3, wherein the one or more processors are individually or collectively configured to cause the peripheral device to:
   count a quantity of bursts received without an end indication; and
   adjust the first specified time duration based at least in part on the quantity of bursts.

5. The peripheral device of claim 3, wherein the one or more processors are individually or collectively configured to cause the peripheral device to adjust the first specified time duration based at least in part on one or more of a power status of the peripheral device or a latency parameter of the peripheral device.

6. The peripheral device of claim 3, wherein the one or more processors are individually or collectively configured to cause the peripheral device to:
   receive a second end indication that indicates an end of the second burst;
   receive a third start indication that indicates a start of a third burst; and
   refrain from entering a low power mode based at least in part on the third start indication being received within a second specified time duration after the second end indication.

7. The peripheral device of claim 6, wherein the second specified time duration is based at least in part on a history or average of pending packets before an end indication is received for a burst.

8. The peripheral device of claim 1, wherein the one or more processors are further configured to cause the peripheral device to enter the low power mode based at least in part receiving a quantity of end indications that corresponds to a quantity of missed wake up intervals.

9. The peripheral device of claim 1, wherein the one or more processors are further configured to cause the peripheral device to:
   receive a third start indication that indicates a start of a third burst;
   receive the third burst; and
   receive a third end indication that indicates an end of the third burst.

10. The peripheral device of claim 1, wherein the one or more processors are individually or collectively configured to cause the peripheral device to:
   receive a second start indication that indicates a start of a second burst;
   receive the second burst;
   receive a second end indication that indicates an end of the second burst; and
   refrain from entering a low power mode based at least in part on a time-to-live value in a packet associated with the second burst satisfying a threshold.

11. The peripheral device of claim 1, wherein the one or more processors are individually or collectively configured to cause the peripheral device to:
   receive a second start indication that indicates a start of a second burst;
   receive the second burst;
   receive a second end indication that indicates an end of the second burst; and
   refrain from entering a low power mode before a third burst is received, based at least in part on a determination that the peripheral device skipped a wake up interval between the first end indication and the second start indication.

12. The peripheral device of claim 1, wherein the one or more processors are individually or collectively configured to cause the peripheral device to:

receive a second burst without receiving a second start indication that indicates a start of the second burst;

receive the second start indication after the second burst has started; and enter a low power mode based at least in part on not receiving, within a first specified time duration, a second end indication that indicates an end of the second burst.

13. The peripheral device of claim 1, wherein the first end indication is included in a real time transport protocol (RTP) header.

14. The peripheral device of claim 13, wherein the first end indication is included in a synchronization source field of the RTP header.

15. The peripheral device of claim 1, wherein the first end indication is included in an extended personal area network (XPAN) preamble.

16. A method of wireless communication performed by a peripheral device, comprising:

receiving a first start indication that indicates a start of a first burst;

receiving the first burst;

receiving a first end indication that indicates an end of the first burst receiving a second start indication that indicates a start of a second burst;

receiving the second burst;

receiving a second end indication that indicates an end of the second burst; and refraining from entering a low power mode based at least in part on a determination that the peripheral device skipped a wake up interval between the first end indication and the second start indication.

17. The method of claim 16, further comprising entering a low power mode based at least in part on receiving the first end indication.

18. The method of claim 16, further comprising:

receiving a second start indication that indicates a start of a second burst;

receiving the second burst; and entering a low power mode based at least in part on not receiving, within a first specified time duration, audio packets or a second end indication that indicates an end of the second burst.

19. The method of claim 16, further comprising:

receiving a second start indication that indicates a start of a second burst;

receiving the second burst;

receiving a second end indication that indicates an end of the second burst; and refraining from entering a low power mode based at least in part on a determination that the peripheral device skipped a wake up interval between the first end indication and the second start indication.

20. The method of claim 16, further comprising:

receiving a second start indication that indicates a start of a second burst;

receiving the second burst;

receiving a second end indication that indicates an end of the second burst; and refraining from entering a low power mode based at least in part on a time-to-live value in a packet associated with the second burst satisfying a threshold.

21. The method of claim 16, further comprising:

receiving a second burst without receiving a second start indication that indicates a start of the second burst;

receiving the second start indication after the second burst has started; and entering a low power mode based at least in part on not receiving, within a first specified time duration, a second end indication that indicates an end of the second burst.

* * * * *